(12) United States Patent
Kokish et al.

(10) Patent No.: US 11,049,713 B1
(45) Date of Patent: Jun. 29, 2021

(54) DETERMINISTIC RESHAPING AND/OR REORDERING OF GROUPS OF ATOMIC OBJECTS WITHIN AN ATOMIC OBJECT CONFINEMENT APPARATUS

(71) Applicant: Honeywell International Inc., Morris Plains, NJ (US)

(72) Inventors: Mark Kokish, Minneapolis, MN (US); Nathaniel Burdick, Morris Plains, NJ (US); James Hostetter, Minneapolis, MN (US); Daniel Gresh, Louisville, CO (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/872,817

(22) Filed: May 12, 2020

(51) Int. Cl.
| | | |
|---|---|---|
| *H01J 49/42* | (2006.01) | |
| *G06N 10/00* | (2019.01) | |
| *H01J 49/00* | (2006.01) | |
| *G06F 17/13* | (2006.01) | |
| *H01J 49/40* | (2006.01) | |
| *H01J 49/06* | (2006.01) | |

(52) U.S. Cl.
CPC .......... *H01J 49/4295* (2013.01); *G06F 17/13* (2013.01); *G06N 10/00* (2019.01); *H01J 49/0036* (2013.01); *H01J 49/065* (2013.01); *H01J 49/406* (2013.01); *H01J 49/425* (2013.01); *H01J 49/426* (2013.01); *H01J 49/4235* (2013.01); *H01J 49/4245* (2013.01)

(58) Field of Classification Search
CPC ............... H01J 49/4295; H01J 49/0036; H01J 49/4245; H01J 49/4235; H01J 49/426; H01J 49/065; H01J 49/406; H01J 49/425; G06F 17/13; G06N 10/00

USPC ................................................... 250/282, 281
See application file for complete search history.

(56) References Cited

U.S. PATENT DOCUMENTS

| | | | | |
|---|---|---|---|---|
| 2007/0272853 | A1* | 11/2007 | Konenkov | H01J 49/4215 250/292 |
| 2007/0295900 | A1* | 12/2007 | Konenkov | H01J 49/4215 250/283 |
| 2013/0068944 | A1* | 3/2013 | Raptakis | H01J 49/40 250/282 |

OTHER PUBLICATIONS

J.P. Home, Quantum Science and Metrology With Mixed-Species Ion Chains, (2013) [retrieved on Jul. 22, 2020] retrieved from the Internet URL: https://arxiv.org/abs/1306.5950, 30 pages.

* cited by examiner

*Primary Examiner* — Kiet T Nguyen
(74) *Attorney, Agent, or Firm* — Alston & Bird LLP

(57) ABSTRACT

Various embodiments provide methods, apparatuses, systems, or computer program products for deterministically reordering a group of atomic objects within an atomic object confinement apparatus. The group of atomic objects comprises Object A, Object B, Object C, and Object D, where Object B and Object C are of a first atomic type, and Object A and Object D are not of the first atomic type. The atomic object confinement apparatus comprises a plurality of potential generating elements which are controlled to create a time-dependent potential field within the atomic object confinement apparatus. The time-dependent potential field experienced by the group of atomic objects causes Object A, Object B, Object C, and Object D to move along corresponding reordering trajectories such that the group of atomic objects is deterministically reshaped and/or reordered.

20 Claims, 11 Drawing Sheets

DETERMINISTIC RESHAPING AND/OR REORDERING OF GROUPS OF ATOMIC OBJECTS WITHIN AN ATOMIC OBJECT CONFINEMENT APPARATUS

TECHNICAL FIELD

Various embodiments relate to apparatuses, systems, and methods relating to controlling atomic objects within an atomic object confinement apparatus. For example, some example embodiments relate to the reordering of ions within an ion trap.

BACKGROUND

An ion trap can use a combination of electrical and magnetic fields to capture a plurality of ions in a potential well. Ions can be trapped for a number of purposes, which may include mass spectrometry, research, and/or controlling quantum states, for example. In various scenarios, it may be desired to change the order of groups of ions within the ion trap. Current reordering schemes are subject to random reordering of the ions within the group of ions, which make it difficult to use such reordering schemes when attempting to perform deterministic processes with the group of ions within the ion trap. Through applied effort, ingenuity, and innovation many deficiencies of such prior ion traps have been solved by developing solutions that are structured in accordance with the embodiments of the present invention, many examples of which are described in detail herein.

BRIEF SUMMARY OF EXAMPLE EMBODIMENTS

Example embodiments provide methods, systems, apparatuses, computer program products and/or the like for performing a deterministic reshaping and/or reordering of a group of atomic objects within an atomic object confinement apparatus. In various embodiments, an atomic object is an ion or an atom. In various embodiments, an atomic object confinement apparatus is a trap or other confinement apparatus configured to confine a plurality of atomic objects. For example, the plurality of atomic objects may be a plurality of ions and the atomic object confinement apparatus may be an ion trap.

According to a first aspect, a method for deterministically reordering a group of atomic objects within an atomic object confinement apparatus is provided. In an example embodiment, the method comprises providing a plurality of atomic objects in an atomic object confinement apparatus. The atomic object confinement apparatus comprises a plurality of potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D to move along corresponding reordering trajectories. The time dependent potential field comprises a confinement potential and a rotating potential. The reordering trajectories comprise an initial chain comprising Object A, Object B, Object C, and Object D aligned substantially along a confinement potential axis of the confinement potential, the initial object chain in either (1) a first configuration where Object B and Object C are adjacent to one another and disposed between Object A and Object D or (2) a second configuration where Object A and Object D are adjacent to one another and disposed between Object B and Object C; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain. The final chain comprises Object A, Object B, Object C, and Object D substantially aligned along the confinement potential axis with Object B and Object C in opposite positions with respect to the initial chain. During a beginning portion of the rotation, the time dependent potential comprises a compression potential that compresses the group of atomic objects in a direction substantially aligned with the confinement potential axis. During an ending portion of the rotation, the time dependent potential comprises a decompression potential that decompresses the group of atomic objects in the direction substantially aligned with the confinement potential axis.

In an example in embodiment, the rotation angle is approximately 180°. In an example embodiment, the positions of Object A and Object D are the same in the initial chain and the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer. In an example embodiment, during a middle portion of the rotation, the middle portion being between the early and the ending portions of the rotation, the group of atomic objects is not colinear.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. The time dependent potential field comprises a confinement potential and a rotating potential. Object B and Object C are of a first atomic type, and Object A and Object D are not of the first atomic type. The reordering trajectories comprise an initial chain comprising Object A, Object B, Object C, and Object D aligned substantially along a confinement potential axis of the confinement potential, the initial object chain in either (1) a first configuration where Object B and Object C are adjacent to one another and disposed between Object A and Object D or (2) a second configuration where Object A and Object D are adjacent to one another and disposed between Object B and Object C; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain. The final chain comprises Object A, Object B, Object C, and Object D substantially aligned along the confinement potential axis with Object B and Object C in opposite positions with respect to the initial chain. During a beginning portion of the rotation, the time dependent potential comprises a compression potential that compresses the group of atomic objects in a direction substantially aligned with the confinement potential axis. During an ending portion of the rotation, the time dependent potential comprises a decompression potential that decompresses the group of atomic objects in the direction substantially aligned with the confinement potential axis.

In an example in embodiment, the rotation angle is approximately 180°. In an example embodiment, the positions of Object A and Object D are the same in the initial chain and the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer. In an example embodiment, during a middle portion of the rotation, the middle portion being between the early and the ending portions of the rotation, the group of atomic objects is not colinear.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. The time-dependent potential field comprises a confinement potential and a rotating potential. Object B and Object C are of a first atomic type, and Object A and Object D are not of the first atomic type. The reordering trajectories comprise an initial chain comprising Object A, Object B, Object C, and Object D aligned substantially along a confinement potential axis of the confinement potential, the initial object chain in either (1) a first configuration where Object B and Object C are adjacent to one another and disposed between Object A and Object D or (2) a second configuration where Object A and Object D are adjacent to one another and disposed between Object B and Object C; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain. The final chain comprises Object A, Object B, Object C, and Object D substantially aligned along the confinement potential axis with Object B and Object C in opposite positions with respect to the initial chain. During a beginning portion of the rotation, the time dependent potential comprises a compression potential that compresses the group of atomic objects in a direction substantially aligned with the confinement potential axis. During an ending portion of the rotation, the time dependent potential comprises a decompression potential that decompresses the group of atomic objects in the direction substantially aligned with the confinement potential axis.

In an example in embodiment, the rotation angle is approximately 180°. In an example embodiment, the positions of Object A and Object D are the same in the initial chain and the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer. In an example embodiment, during a middle portion of the rotation, the middle portion being between the early and the ending portions of the rotation, the group of atomic objects is not colinear.

According to still another aspect, a method for deterministically reordering a group of atomic objects within an atomic object confinement apparatus is provided. In an example embodiment, the method comprises providing a plurality of atomic objects in an atomic object confinement apparatus. The atomic object confinement apparatus comprises a plurality of potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D move along corresponding reordering trajectories. The time dependent potential field comprises a confinement potential and a rotating potential. The reordering trajectories comprise an initial chain comprising Object A, Object B, Object C, and Object D aligned substantially along a confinement potential axis of the confinement potential. The initial chain in either (1) a first configuration where Object B and Object C are adjacent to one another and disposed between Object A and Object D or (2) a second configuration where Object A and Object D are adjacent to one another and disposed between Object B and Object C. The reordering trajectories further comprise a rotation of Object B and Object C in a first direction caused by a rotating potential axis defined by the rotating potential rotating in a first direction such that the rotating potential axis rotates with respect to the confinement potential axis through a first sequence angle until an angle between (a) the rotating potential axis and (b) the confinement potential axis is a transition angle; and during a beginning portion of the rotation of the rotating potential axis through the first sequence angle, a compression the group of atomic objects in a direction substantially aligned with the confinement potential axis. The reordering trajectories further comprise, after the angle between (a) the rotating potential axis and (b) the confinement potential axis reaches the transition angle, when the initial chain is in the first configuration, a further compression the group of atomic objects in the direction substantially aligned with the confinement potential axis or, when the initial chain is in the second configuration, a partial decompression the group of atomic objects in the direction substantially aligned with the confinement potential axis. The reordering trajectories further comprise a rotation of Object B and Object C in either the first or second direction caused by the rotating potential axis rotating in the first or second direction such that the rotating potential axis rotates with respect to the confinement potential axis through a second sequence angle; and during an ending portion of the rotation, a decompression of the group of atomic objects in the direction substantially aligned with the axis. When the rotating potential axis has been rotated through the second sequence angle, the group of atomic objects are arranged in a final chain. The final chain comprises Object A, Object B, Object C, and Object D aligned substantially along the confinement potential axis. When the initial chain is in the first configuration, the final chain is in the second configuration and when the initial chain is in the second configuration, the final chain is in the first configuration.

In an example embodiment, the direction of rotation of the second sequence angle is determined based on a desired final position of Object B or Object C. In an example embodiment, the transition angle is in the range of approximately 70°-110°. In an example embodiment, when Object B and Object C have been rotated through the second sequence angle, the angle between the virtual line connecting Object B and Object C and the axis is a final second sequence angle and the final second sequence angle is one of approximately 0° or approximately 180°. In an example embodiment, the angle between the virtual line connecting Object B and Object C and the axis reaches the transition angle, the group of atomic objects is not colinear. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial chain in either (1) a first configuration where Object B and Object C are adjacent to one another and disposed between Object A and Object D or (2) a second configuration where Object A and Object D are adjacent to one another and disposed between Object B and Object C. The reordering trajectories further comprise a rotation of Object B and Object C in a first direction caused by a rotating potential axis defined by the rotating potential rotating in a first direction such that the rotating potential axis rotates with respect to the confinement potential axis through a first sequence angle until an angle between (a) the rotating potential axis and (b) the confinement potential axis is a transition angle; and during a beginning portion of the rotation of the rotating potential axis through the first sequence angle, a compression the group of atomic objects in a direction substantially aligned with the confinement potential axis. The reordering trajectories further comprise, after the angle between (a) the rotating potential axis and (b) the confinement potential axis reaches the transition angle, when the initial chain is in the first configuration, a further compression the group of atomic objects in the direction substantially aligned with the confinement potential axis or, when the initial chain is in the second configuration, a partial decompression the group of atomic objects in the direction substantially aligned with the confinement potential axis. The reordering trajectories further comprise a rotation of Object B and Object C in either the first or second direction caused by the rotating potential axis rotating in the first or second direction such that the rotating potential axis rotates with respect to the confinement potential axis through a second sequence angle; and during an ending portion of the rotation, a decompression of the group of atomic objects in the direction substantially aligned with the axis. When the rotating potential axis has been rotated through the second sequence angle, the group of atomic objects are arranged in a final chain. The final chain comprises Object A, Object B, Object C, and Object D aligned substantially along the confinement potential axis. When the initial chain is in the first configuration, the final chain is in the second configuration and when the initial chain is in the second configuration, the final chain is in the first configuration.

In an example embodiment, the direction of rotation of the second sequence angle is determined based on a desired final position of Object B or Object C. In an example embodiment, the transition angle is in the range of approximately 70°-110°. In an example embodiment, when Object B and Object C have been rotated through the second sequence angle, the angle between the virtual line connecting Object B and Object C and the axis is a final second sequence angle and the final second sequence angle is one of approximately 0° or approximately 180°. In an example embodiment, the angle between the virtual line connecting Object B and Object C and the axis reaches the transition angle, the group of atomic objects is not colinear. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial chain in either (1) a first configuration where Object B and Object C are adjacent to one another and disposed between Object A and Object D or (2) a second configuration where Object A and Object D are adjacent to one another and disposed between Object B and Object C. The reordering trajectories further comprise a rotation of Object B and Object C in a first direction caused by a rotating potential axis defined by the rotating potential rotating in a first direction such that the rotating potential axis rotates with respect to the confinement potential axis through a first sequence angle until an angle between (a) the rotating potential axis and (b) the confinement potential axis is a transition angle; and during a beginning portion of the rotation of the rotating potential axis through the first sequence angle, a compression the group of atomic objects in a direction substantially aligned with the confinement potential axis. The reordering trajectories further comprise, after the angle between (a) the rotating potential axis and (b) the confinement potential axis reaches the transition angle, when the initial chain is in the first configuration, a further compression the group of atomic objects in the direction substantially aligned with the confinement potential axis or, when the initial chain is in the second configuration, a partial decompression the group of atomic objects in the direction substantially aligned with the confinement potential axis. The reordering trajectories further comprise a rotation of Object B and Object C in either the first or second direction caused by the rotating potential axis rotating in the first or second direction such that the rotating potential axis rotates with respect to the confinement potential axis through a second sequence angle; and during an ending portion of the rotation, a decompression of the group of atomic objects in the direction substantially aligned with the axis. When the rotating potential axis has been rotated through the second sequence angle, the group of atomic objects are arranged in a final chain. The final chain comprises Object A, Object B, Object C, and Object D aligned substantially along the confinement potential axis. When the initial chain is in the first configuration, the final chain is in the second configuration and when the initial chain is in the second configuration, the final chain is in the first configuration.

In an example embodiment, the direction of rotation of the second sequence angle is determined based on a desired final position of Object B or Object C. In an example embodiment, the transition angle is in the range of approximately 70°-110°. In an example embodiment, when Object B and Object C have been rotated through the second sequence angle, the angle between the virtual line connecting Object B and Object C and the axis is a final second sequence angle and the final second sequence angle is one of approximately 0° or approximately 180°. In an example embodiment, the angle between the virtual line connecting Object B and Object C and the axis reaches the transition angle, the group of atomic objects is not colinear. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to still another aspect, method for deterministically reordering atomic objects within an atomic object confinement apparatus. In an example embodiment, the method comprises providing a plurality of atomic objects in an atomic object confinement apparatus. The atomic object confinement apparatus comprises a plurality potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D move along corresponding reordering trajectories. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain in a first configuration where Object B and Object C are adjacent to one another and disposed between Object A and Object D. The reordering trajectories further comprise a rotation of the initial chain to form a rotated initial chain caused by the rotating potential rotating in a first direction such that a rotating potential axis defined by the rotating potential rotates by a first angle with respect to a confinement potential axis; a compression of the rotated initial chain along a direction substantially parallel to the confinement potential axis such that Object B is further from the confinement potential axis than Object A and Object C is further from the confinement potential axis than Object D, to form a compressed configuration; a rotation of the compressed configuration in a second direction caused by the rotating potential rotating in the second direction such that the rotating potential axis rotates through a second angle with respect to the confinement potential axis, the second angle being substantially equal to two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction through a third angle with respect to the confinement potential axis to provide a final chain. The third angle is substantially equal to the first angle. The final chain comprises Object A, Object B, Object C, and Object D aligned substantially along the confinement potential axis with Object B and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain in a first configuration where Object B and Object C are adjacent to one another and disposed between Object A and Object D. The reordering trajectories further comprise a rotation of the initial chain to form a rotated initial chain caused by the rotating potential rotating in a first direction such that a rotating potential axis defined by the rotating potential rotates by a first angle with respect to a confinement potential axis; a compression of the rotated initial chain along a direction substantially parallel to the confinement potential axis such that Object B is further from the confinement potential axis than Object A and Object C is further from the confinement potential axis than Object D, to form a compressed configuration; a rotation of the compressed configuration in a second direction caused by the rotating potential rotating in the second direction such that the rotating potential axis rotates through a second angle with respect to the confinement potential axis, the second angle being substantially equal to two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction through a third angle with respect to the confinement potential axis to provide a final chain. The third angle is substantially equal to the first angle. The final chain comprises Object A, Object B, Object C, and Object D aligned substantially along the confinement potential axis with Object B and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain in a first configuration where Object B and Object C are adjacent to one another and disposed between Object A and Object D. The reordering trajectories further comprise a rotation of the initial chain to form a rotated initial chain caused by the rotating potential rotating in a first direction such that a rotating potential axis defined by the rotating potential rotates by a first angle with respect to a confinement potential axis; a compression of the rotated initial chain along a direction substantially parallel to the confinement potential axis such that Object B is further from the confinement potential axis than Object A and Object C is further from the confinement potential axis than Object D, to form a compressed configuration; a rotation of the compressed configuration in a second direction caused by the rotating potential rotating in the second direction such that the rotating potential axis rotates through a second angle with respect to the confinement potential axis, the second angle being substantially equal to two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction through a third angle with respect to the confinement potential axis to provide a final chain. The third angle is substantially equal to the first angle. The final chain comprises Object A, Object B, Object C, and Object D aligned substantially along the confinement potential axis with Object B and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to still another aspect, a method for deterministically reordering a group of atomic objects within an atomic object confinement apparatus is provided. In an example embodiment, the method comprises providing a plurality of atomic objects in an atomic object confinement apparatus. The atomic object confinement apparatus comprises a plurality potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D move along corresponding reordering trajectories. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain is in a third configuration where Object B and Object C are adjacent to one another and Object A and Object D are adjacent to one another. The reordering trajectories further comprise a rotation of the initial chain to form a rotated initial chain by controlling the potential generating elements to cause the rotating potential to rotate in a first direction such that a rotating potential axis defined by the rotating potential rotates by a first angle with respect to the confinement potential axis; a compression of the rotated initial chain along a direction substantially parallel to the confinement potential axis, to form a compressed configuration; a rotation of the compressed configuration in a second direction by controlling the potential generating elements to cause the rotating potential to rotate in the second direction such that the rotating potential axis rotates through a second angle with respect to the confinement potential axis, the second angle being greater than two times the first angle and the second direction being opposite the first direction, to provide a rotated configuration; a decompression of the rotated configuration along the confinement potential axis to form an off-axis final chain; and a rotation of the off-axis final chain in the first direction by controlling the potential generating elements to cause the rotating potential to rotate in the first direction such that the rotating potential axis rotates through a third angle with respect to the confinement potential axis to provide a final chain aligned substantially along the confinement potential axis. The final chain comprising Object A, Object B, Object C, and Object D with Object A and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain is in a third configuration where Object B and Object C are adjacent to one another and Object A and Object D are adjacent to one another. The reordering trajectories further comprise a rotation of the initial chain to form a rotated initial chain by controlling the potential generating elements to cause the rotating potential to rotate in a first direction such that a rotating potential axis defined by the rotating potential rotates by a first angle with respect to the confinement potential axis; a compression of the rotated initial chain along a direction substantially parallel to the confinement potential axis, to form a compressed configuration; a rotation of the compressed configuration in a second direction by controlling the potential generating elements to cause the rotating potential to rotate in the second direction such that the rotating potential axis rotates through a second angle with respect to the confinement potential axis, the second angle being greater than two times the first angle and the second direction being opposite the first direction, to provide a rotated configuration; a decompression of the rotated configuration along the confinement potential axis to form an off-axis final chain; and a rotation of the off-axis final chain in the first direction by controlling the potential generating elements to cause the rotating potential to rotate in the first direction such that the rotating potential axis rotates through a third angle with respect to the confinement potential axis to provide a final chain aligned substantially along the confinement potential axis. The final chain comprising Object A, Object B, Object C, and Object D with Object A and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential. The initial object chain is in a third configuration where Object B and Object C are adjacent to one another and Object A and Object D are adjacent to one another. The reordering trajectories further comprise a rotation of the initial chain to form a rotated initial chain by controlling the potential generating elements to cause the rotating potential to rotate in a first direction such that a rotating potential axis defined by the rotating potential rotates by a first angle with respect to the confinement potential axis; a compression of the rotated initial chain along a direction substantially parallel to the confinement potential axis, to form a compressed configuration; a rotation of the compressed configuration in a second direction by controlling the potential generating elements to cause the rotating potential to rotate in the second direction such that the rotating potential axis rotates through a second angle with respect to the confinement potential axis, the second angle being greater than two times the first angle and the second direction being opposite the first direction, to provide a rotated configuration; a decompression of the rotated configuration along the confinement potential axis to form an off-axis final chain; and a rotation of the off-axis final chain in the first direction by controlling the potential generating elements to cause the rotating potential to rotate in the first direction such that the rotating potential axis rotates through a third angle with respect to the confinement potential axis to provide a final chain aligned substantially along the confinement potential axis. The final chain comprising Object A, Object B, Object C, and Object D with Object A and Object C in opposite positions with respect to the initial chain.

In an example embodiment, the first angle is greater than 0° and less than 90°. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, the corresponding voltage drivers are controlled by a controller of a quantum computer.

According to still another aspect, a method for deterministically reordering a group of atomic objects within an atomic object confinement apparatus is provided. In an example embodiment, the method comprises providing a plurality of atomic objects in an atomic object confinement apparatus. The atomic object confinement apparatus comprises a plurality potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D move along corresponding reordering trajectories. The time dependent potential field comprises a confinement potential, a rotating potential, and a radial push potential. A time evolution of the amplitude of the radial push potential comprises a monotonic increase to a maximum followed by a monotonic decrease to a minimum. The reordering trajectories comprise an initial chain comprising Object A, Object B, Object C, and Object D aligned substantially along a confinement potential axis of the confinement potential, the initial object chain in a third configuration where Object B and Object C are adjacent to one another and Object A and Object D are adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, Object B and Object C each have a greater mass than Object A and Object D, respectively. In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, the first angle is greater than 0° and less than 90°. In an example embodiment, a time evolution of the rotating potential comprises a rotation of a rotating potential axis of the rotating potential in a first direction through an angle of approximately 180° with respect to a confinement potential axis of the confinement potential.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential, a rotating potential, and a radial push potential. A time evolution of the amplitude of the radial push potential comprises a monotonic increase to a maximum followed by a monotonic decrease to a minimum. The reordering trajectories comprise an initial chain comprising Object A, Object B, Object C, and Object D aligned substantially along a confinement potential axis of the confinement potential, the initial object chain in a third configuration where Object B and Object C are adjacent to one another and Object A and Object D are adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, Object B and Object C each have a greater mass than Object A and Object D, respectively. In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, the first angle is greater than 0° and less than 90°. In an example embodiment, a time evolution of the rotating potential comprises a rotation of a rotating potential axis of the rotating potential in a first direction through an angle of approximately 180° with respect to a confinement potential axis of the confinement potential.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential, a rotating potential, and a radial push potential. A time evolution of the amplitude of the radial push potential comprises a monotonic increase to a maximum followed by a monotonic decrease to a minimum. The reordering trajectories comprise an initial chain comprising Object A, Object B, Object C, and Object D aligned substantially along a confinement potential axis of the confinement potential, the initial object chain in a third configuration where Object B and Object C are adjacent to one another and Object A and Object D are adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, Object B and Object C each have a greater mass than Object A and Object D, respectively. In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, the first angle is greater than 0° and less than 90°. In an example embodiment, a time evolution of the rotating potential comprises a rotation of a rotating potential axis of the rotating potential in a first direction through an angle of approximately 180° with respect to a confinement potential axis of the confinement potential.

According to another aspect of the present invention, a method for deterministically reordering a group of atomic objects within an atomic object confinement apparatus is provided. For example, the method may deterministically reorder a group of atomic objects within an atomic object confinement apparatus similar to the examples illustrated in FIGS. 4, 5, and/or 6. In an example embodiment, the method comprises providing a plurality of atomic objects in an atomic object confinement apparatus. The atomic object confinement apparatus comprises a plurality of potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D to move along corresponding reordering trajectories. The time dependent potential field comprises a confinement potential and a rotating potential. The reordering trajectories comprise an initial chain comprising Object A, Object B, Object C, and Object D aligned substantially along a confinement potential axis of the confinement potential; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain, the final chain comprising Object A, Object B, Object C, and Object D substantially aligned along the confinement potential axis and in a different order with respect to the initial chain. During a beginning portion of the rotation, a confinement ratio of the time dependent potential is adjusted to cause a compression of the group of atomic objects in a direction substantially aligned with the confinement potential axis. During an ending portion of the rotation, the confinement ratio of the time dependent potential is adjusted to cause a decompression the group of atomic objects in the direction substantially aligned with the confinement potential axis.

In an example embodiment, the rotation angle is approximately 180°. In an example embodiment, an interior two of Object A, Object B, Object C, and Object D in the initial chain have switched positions in the final chain. In an example embodiment, an exterior two of Object A, Object B, Object C, and Object D in the initial chain have switched positions in the final chain. In an example embodiment, an exterior two of Object A, Object B, Object C, and Object D in the initial chain are an interior two of the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, during a middle portion of the rotation, the middle portion being between the early and the ending portions of the rotation, the group of atomic objects is not colinear. In an example embodiment, after the angle between the rotating potential axis and the confinement potential axis reaches a transition angle, the confinement ratio of the time dependent potential is adjusted to cause one of (a) a further compression the group of atomic objects in the direction substantially aligned with the confinement potential axis or (b) a partial decompression the group of atomic objects in the direction substantially aligned with the confinement potential axis. In an example embodiment, (a) the rotation angle is the transition angle, and (b) after the rotating potential axis has rotated through the rotation angle in the first direction, the rotating potential axis is rotated in a second direction such that the rotating potential axis rotates with respect to the confinement potential axis through a second sequence angle, the second direction being opposite the first direction. In an example embodiment, the transition angle is in the range of approximately 70°-110°.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain, the final chain comprising Object A, Object B, Object C, and Object D substantially aligned along the confinement potential axis and in a different order with respect to the initial chain. During a beginning portion of the rotation, a confinement ratio of the time dependent potential is adjusted to cause a compression of the group of atomic objects in a direction substantially aligned with the confinement potential axis. During an ending portion of the rotation, the confinement ratio of the time dependent potential is adjusted to cause a decompression the group of atomic objects in the direction substantially aligned with the confinement potential axis.

In an example embodiment, the rotation angle is approximately 180°. In an example embodiment, an interior two of Object A, Object B, Object C, and Object D in the initial chain have switched positions in the final chain. In an example embodiment, an exterior two of Object A, Object B, Object C, and Object D in the initial chain have switched positions in the final chain. In an example embodiment, an exterior two of Object A, Object B, Object C, and Object D in the initial chain are an interior two of the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, during a middle portion of the rotation, the middle portion being between the early and the ending portions of the rotation, the group of atomic objects is not colinear. In an example embodiment, after the angle between the rotating potential axis and the confinement potential axis reaches a transition angle, the confinement ratio of the time dependent potential is adjusted to cause one of (a) a further compression the group of atomic objects in the direction substantially aligned with the confinement potential axis or (b) a partial decompression the group of atomic objects in the direction substantially aligned with the confinement potential axis. In an example embodiment, (a) the rotation angle is the transition angle, and (b) after the rotating potential axis has rotated through the rotation angle in the first direction, the rotating potential axis is rotated in a second direction such that the rotating potential axis rotates with respect to the confinement potential axis through a second sequence angle, the second direction being opposite the first direction. In an example embodiment, the transition angle is in the range of approximately 70°-110°.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential; a rotation of Object B and Object C in a first direction caused by a rotating potential axis defined by the rotating potential rotating in a first direction such that the rotating potential axis rotates through a rotation angle with respect to the confinement potential axis; and realignment of the group of atomic objects into a final chain, the final chain comprising Object A, Object B, Object C, and Object D substantially aligned along the confinement potential axis and in a different order with respect to the initial chain. During a beginning portion of the rotation, a confinement ratio of the time dependent potential is adjusted to cause a compression of the group of atomic objects in a direction substantially aligned with the confinement potential axis. During an ending portion of the rotation, the confinement ratio of the time dependent potential is adjusted to cause a decompression the group of atomic objects in the direction substantially aligned with the confinement potential axis.

In an example embodiment, the rotation angle is approximately 180°. In an example embodiment, an interior two of Object A, Object B, Object C, and Object D in the initial chain have switched positions in the final chain. In an example embodiment, an exterior two of Object A, Object B, Object C, and Object D in the initial chain have switched positions in the final chain. In an example embodiment, an exterior two of Object A, Object B, Object C, and Object D in the initial chain are an interior two of the final chain. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers. In an example embodiment, during a middle portion of the rotation, the middle portion being between the early and the ending portions of the rotation, the group of atomic objects is not colinear. In an example embodiment, after the angle between the rotating potential axis and the confinement potential axis reaches a transition angle, the confinement ratio of the time dependent potential is adjusted to cause one of (a) a further compression the group of atomic objects in the direction substantially aligned with the confinement potential axis or (b) a partial decompression the group of atomic objects in the direction substantially aligned with the confinement potential axis. In an example embodiment, (a) the rotation angle is the transition angle, and (b) after the rotating potential axis has rotated through the rotation angle in the first direction, the rotating potential axis is rotated in a second direction such that the rotating potential axis rotates with respect to the confinement potential axis through a second sequence angle, the second direction being opposite the first direction. In an example embodiment, the transition angle is in the range of approximately 70°-110°.

According to yet another aspect, a method for deterministically reordering atomic objects within an atomic object confinement apparatus is provided. For example, the method may deterministically reorder a group of atomic objects within an atomic object confinement apparatus similar to the examples illustrated in FIGS. 3 and/or 7. In an example embodiment, the method comprises providing a plurality of atomic objects in an atomic object confinement apparatus. The atomic object confinement apparatus comprises a plurality potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D move along corresponding reordering trajectories. The time dependent potential field is a superposition of a confinement potential and a rotating potential. The reordering trajectories comprise an initial chain comprising Object A, Object B, Object C, and Object D aligned substantially along a confinement potential axis of the confinement potential; a rotation of the initial chain to form a rotated initial chain caused by a rotating potential axis defined by the rotating potential rotating in a first direction such that the rotating potential axis rotates by a first angle with respect to the confinement potential axis; a compression of the rotated initial chain along a direction substantially parallel to the confinement potential axis to form a compressed configuration; a rotation of the compressed configuration in a second direction caused by the rotating potential axis rotating in the second direction such that the rotating potential axis rotates through a second angle with respect to the confinement potential axis, the second angle being substantially equal to or greater than two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction such that the rotating potential axis rotates through a third angle to cause the rotating potential axis to be substantially parallel to the confinement potential axis and provide a final chain, wherein an interior two of Object A, Object B, Object C, and Object D in the initial chain have switched positions in the final chain.

In an example embodiment, the first angle is greater than 0° and less than 90°. In an example embodiment, the first angle is greater than 5° and less than 60°. In an example embodiment, the compression and decompression is caused by adjusting a confinement ratio of the time dependent potential. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential; a rotation of the initial chain to form a rotated initial chain caused by a rotating potential axis defined by the rotating potential rotating in a first direction such that the rotating potential axis rotates by a first angle with respect to the confinement potential axis; a compression of the rotated initial chain along a direction substantially parallel to the confinement potential axis to form a compressed configuration; a rotation of the compressed configuration in a second direction caused by the rotating potential axis rotating in the second direction such that the rotating potential axis rotates through a second angle with respect to the confinement potential axis, the second angle being substantially equal to or greater than two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction such that the rotating potential axis rotates through a third angle to cause the rotating potential axis to be substantially parallel to the confinement potential axis and provide a final chain, wherein an interior two of Object A, Object B, Object C, and Object D in the initial chain have switched positions in the final chain.

In an example embodiment, the first angle is greater than 0° and less than 90°. In an example embodiment, the first angle is greater than 5° and less than 60°. In an example embodiment, the compression and decompression is caused by adjusting a confinement ratio of the time dependent potential. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field comprises a confinement potential and a rotating potential. The reordering trajectories comprise an initial chain comprising Object A, Object B, Object C, and Object D aligned substantially along a confinement potential axis of the confinement potential; a rotation of the initial chain to form a rotated initial chain caused by a rotating potential axis defined by the rotating potential rotating in a first direction such that the rotating potential axis rotates by a first angle with respect to the confinement potential axis; a compression of the rotated initial chain along a direction substantially parallel to the confinement potential axis to form a compressed configuration; a rotation of the compressed configuration in a second direction caused by the rotating potential axis rotating in the second direction such that the rotating potential axis rotates through a second angle with respect to the confinement potential axis, the second angle being substantially equal to or greater than two times the first angle and the second direction being opposite the first direction, to provide a rotated configuration; a decompression of the rotated configuration along the confinement potential axis to form an off-axis final chain; and a rotation of the off-axis final chain in the first direction caused by the rotating potential axis rotating in the first direction such that the rotating potential axis rotates through a third angle to cause the rotating potential axis to be substantially parallel to the confinement potential axis and provide a final chain, wherein an interior two of Object A, Object B, Object C, and Object D in the initial chain have switched positions in the final chain.

In an example embodiment, the first angle is greater than 0° and less than 90°. In an example embodiment, the first angle is greater than 5° and less than 60°. In an example embodiment, the compression and decompression is caused by adjusting a confinement ratio of the time dependent potential. In an example embodiment, the potential generating elements are controlled in accordance with a solution for a time-dependent potential field found by solving a Hamiltonian using the reordering trajectories. In an example embodiment, the atomic objects are ions, the atomic object confinement apparatus is an ion trap, the potential generating elements are electrodes, and the potential generating elements are controlled by applying voltages thereto by corresponding voltage drivers.

In still another aspect, a method for deterministically reordering a group of atomic objects within an object confinement apparatus is provided. For example, the method may deterministically reorder a group of atomic objects within an atomic object confinement apparatus similar to the example illustrated in FIG. 8. In an example embodiment, the method comprises providing a plurality of atomic objects in an atomic object confinement apparatus. The atomic object confinement apparatus comprises a plurality of potential generating elements. The plurality of atomic objects comprises Object A, Object B, Object C, and Object D. Object B and Object C are of a first atomic type, and Object A and Object D are not of the first atomic type. The method further comprises controlling potential generating elements of the plurality of potential generating elements to create a time dependent potential field within the atomic object confinement apparatus that causes Object A, Object B, Object C, and Object D to move along corresponding reordering trajectories. The time dependent potential field is a superposition of a confinement potential, a rotating potential, and a radial push potential. A time evolution of the amplitude of the radial push potential consists of a monotonic increase to a maximum followed by a monotonic decrease to a minimum. The reordering trajectories comprise an initial chain comprising Object A, Object B, Object C, and Object D aligned substantially along a confinement potential axis of the confinement potential with Object B and Object C adjacent to one another and Object A and Object D adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, a time evolution of the rotating potential comprises a rotation of a rotating potential axis of the rotating potential in a first direction through an angle of approximately 180° with respect to a confinement potential axis of the confinement potential.

According to another aspect, an apparatus and/or system for performing a deterministic reshaping and/or reordering function is provided. In an example embodiment, the apparatus and/or system comprises an atomic object confinement apparatus comprising a plurality of potential generating elements and one or more drivers configured to provide driver action sequences to the plurality of potential generating elements to control the potential field generated by the plurality of potential generating elements. The apparatus and/or system is configured to operate the one or more drivers to cause the plurality of potential generating elements to create a time dependent potential field within the atomic object confinement apparatus that causes Object A, Object B, Object C, and Object D to move along corresponding reordering trajectories. Object B and Object C are of a first atomic type, and Object A and Object D are not of the first atomic type. The time dependent potential field is a superposition of a confinement potential, a rotating potential, and a radial push potential. A time evolution of the amplitude of the radial push potential consists of a monotonic increase to a maximum followed by a monotonic decrease to a minimum. The reordering trajectories comprise an initial chain comprising Object A, Object B, Object C, and Object D aligned substantially along a confinement potential axis of the confinement potential with Object B and Object C adjacent to one another and Object A and Object D adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, a time evolution of the rotating potential comprises a rotation of a rotating potential axis of the rotating potential in a first direction through an angle of approximately 180° with respect to a confinement potential axis of the confinement potential.

According to yet another aspect, a computer program product is provided. In an example embodiment, the computer program product comprises a non-transitory, machine-readable storage medium storing executable instructions that, when executed with a processor of a controller, cause the controller to operate one or more drivers to provide driver action sequences to potential generating elements of an atomic object confinement apparatus such that the potential generating elements create a time-dependent potential field that causes Object A, Object B, Object C, and Object D to move along corresponding reordering trajectories. Object B and Object C are of a first atomic type, and Object A and Object D are not of the first atomic type. The time dependent potential field is a superposition of a confinement potential, a rotating potential, and a radial push potential. A time evolution of the amplitude of the radial push potential consists of a monotonic increase to a maximum followed by a monotonic decrease to a minimum. The reordering trajectories comprise an initial chain comprising Object A, Object B, Object C, and Object D aligned substantially along a confinement potential axis of the confinement potential with Object B and Object C adjacent to one another and Object A and Object D adjacent to one another; a movement of Object A, Object B, Object C, and Object D radially outward from the confinement potential axis, wherein Object B and Object C move farther from the confinement potential axis than Object A and Object D; a movement of Object B and Object C from a first side of Object A and Object D to a second, opposite side of Object A and Object D; and a realignment of Object A, Object B, Object C, and Object D along the confinement potential axis in a final chain. The final chain comprises Object A, Object B, Object C, and Object D with Object B and Object C in opposite positions with respect Object A and Object D with respect to the initial chain.

In an example embodiment, a time evolution of the rotating potential comprises a first rotation of a rotating potential axis of the rotating potential in a first direction through a first angle with respect to a confinement potential axis of the confinement potential; a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle. In an example embodiment, a time evolution of the rotating potential comprises a rotation of a rotating potential axis of the rotating potential in a first direction through an angle of approximately 180° with respect to a confinement potential axis of the confinement potential.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 provides a top view of an example atomic object confinement apparatus that may be used in example embodiment.

Figure 10:
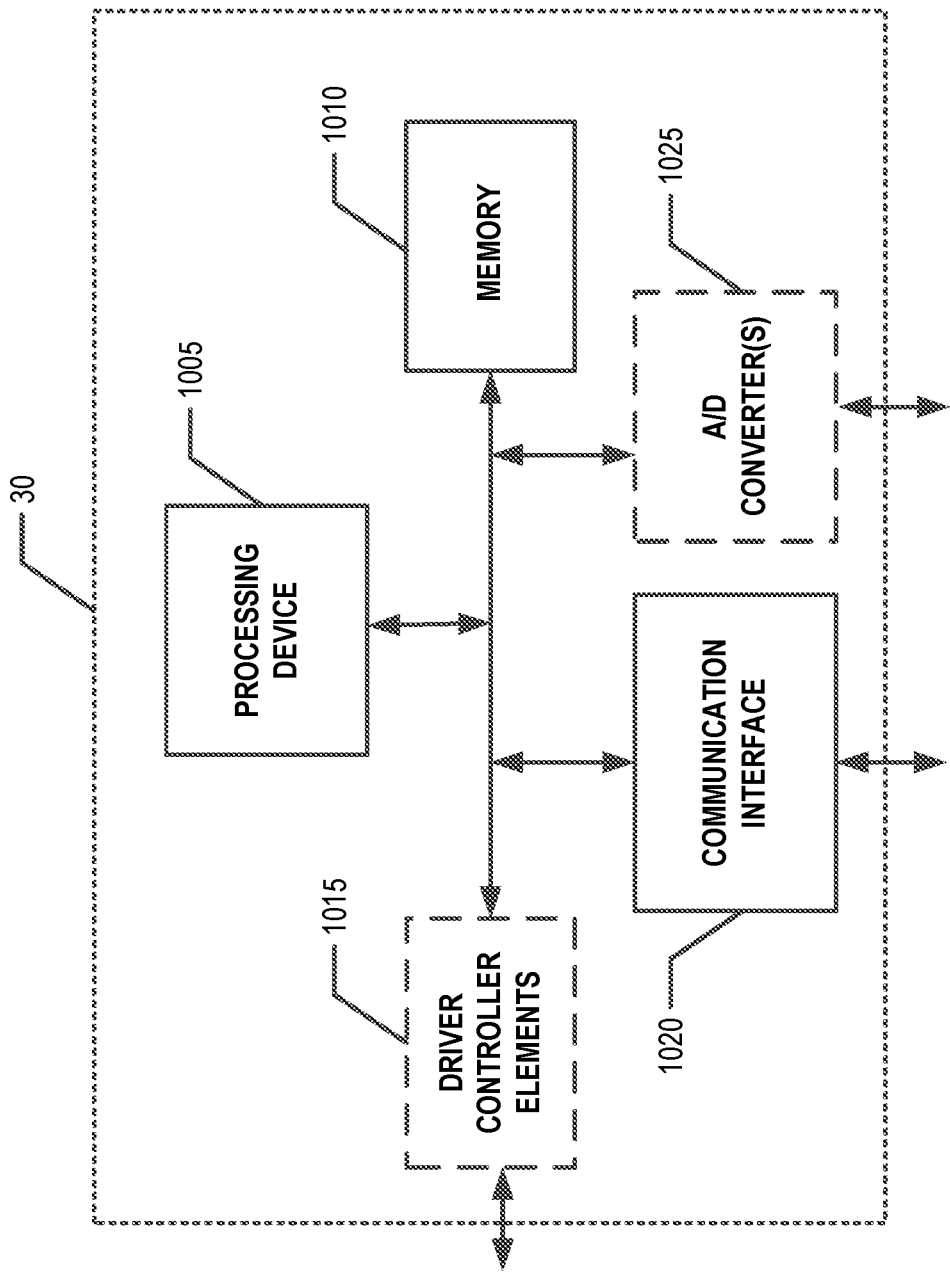

FIG. 10 provides a schematic diagram of an example controller of a quantum computer configured to perform one or more deterministic reshaping and/or reordering functions, according to various embodiments.

Figure 11:
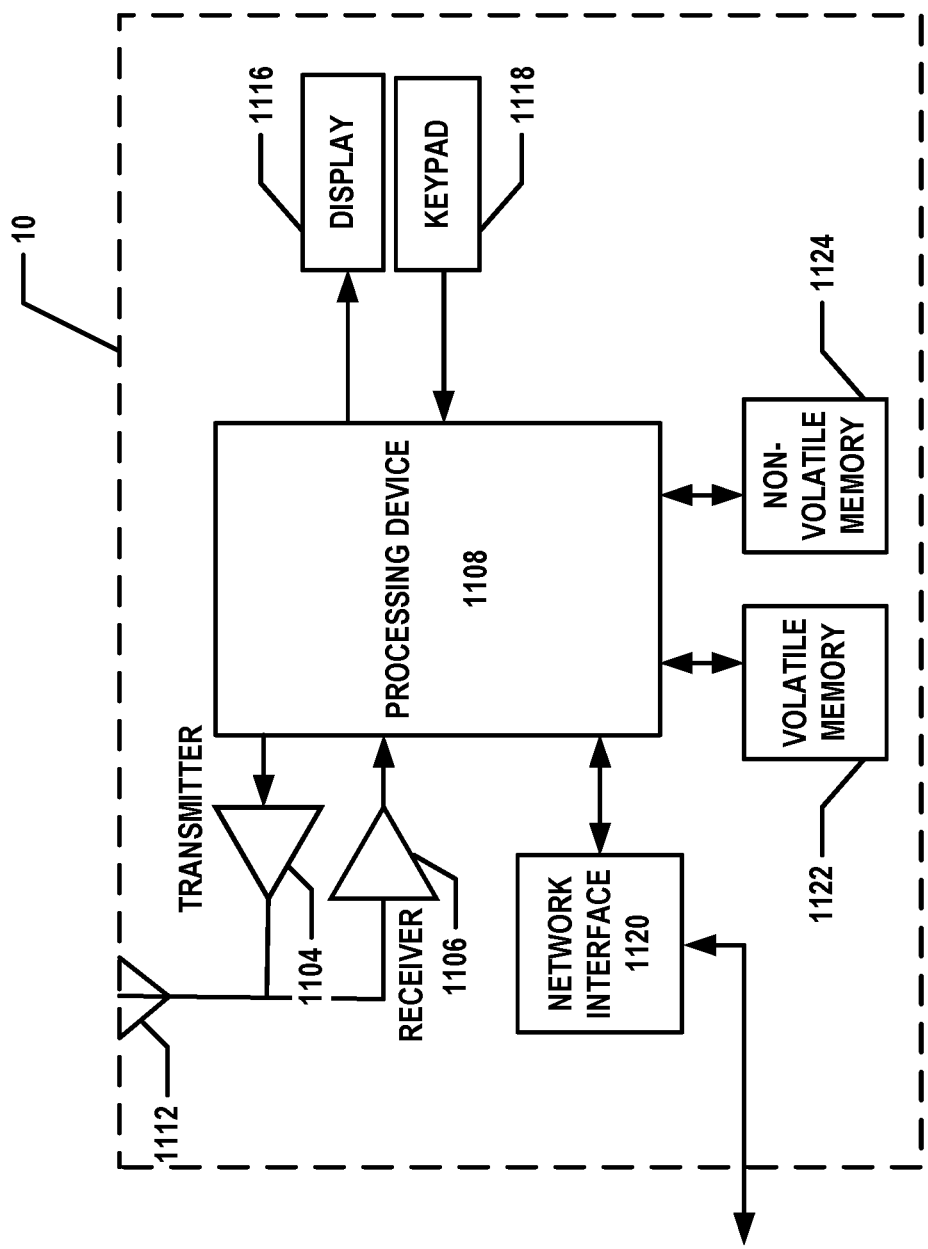

FIG. 11 provides a schematic diagram of an example computing entity of a quantum computer system that may be used in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

In various embodiments, methods, apparatuses, systems, computer program products, and/or the like for performing various deterministic reshaping and/or reordering functions for a group of atomic objects are provided. In various embodiments, the group of atomic objects are at least part of a plurality of atomic objects confined within an atomic object confinement apparatus (also referred to as a confinement apparatus herein). In various embodiments, the atomic objects are ions or atoms. In various embodiments, the confinement apparatus is a trap or other apparatus configured to confine the atomic objects. For example, in an example embodiment, the atomic objects are ions and the confinement apparatus is an ion trap (e.g., a surface ion trap).

In various embodiments, the group of atomic objects comprises and/or consists of Object A, Object B, Object C, and Object D, wherein Object A, Object B, Object C, and Object D are each an atomic object. In an example embodiment, Object B and Object C are of a first atomic object type. For example, Object B and Object C are the same type of ion. In an example embodiment, Object B and Object C are singly ionized ytterbium ions, though they may be various other types of atomic objects in various embodiments. In various embodiments, Object A and Object D are not of the first atomic object type. For example, in the example embodiment where Object B and Object C are singly ionized ytterbium ions, Object A and Object D are not ytterbium ions. In an example embodiment, Object A and Object D are singly ionized barium ions, though they may be various other types of atomic objects in various embodiments. In another example, Object B and Object C are barium ions and Object A and Object D are strontium ions. In various embodiments, Object A and Object D each have a smaller mass than Object B and Object C. In various embodiments, the ratio of the mass of Object A to the mass of Object D is the range of approximately 1:0.8 to 1:1.2. In an example embodiment, Object B and Object C are of different atomic types and the ratio of the mass of Object B to the mass of Object C is in the range of approximately 1:0.8 to 1:1.2. In an example embodiment, Object B and Object C are both of the first atomic object type and the ratio of the mass of Object B to the mass of Object C is approximately 1:1.

Figure 3:
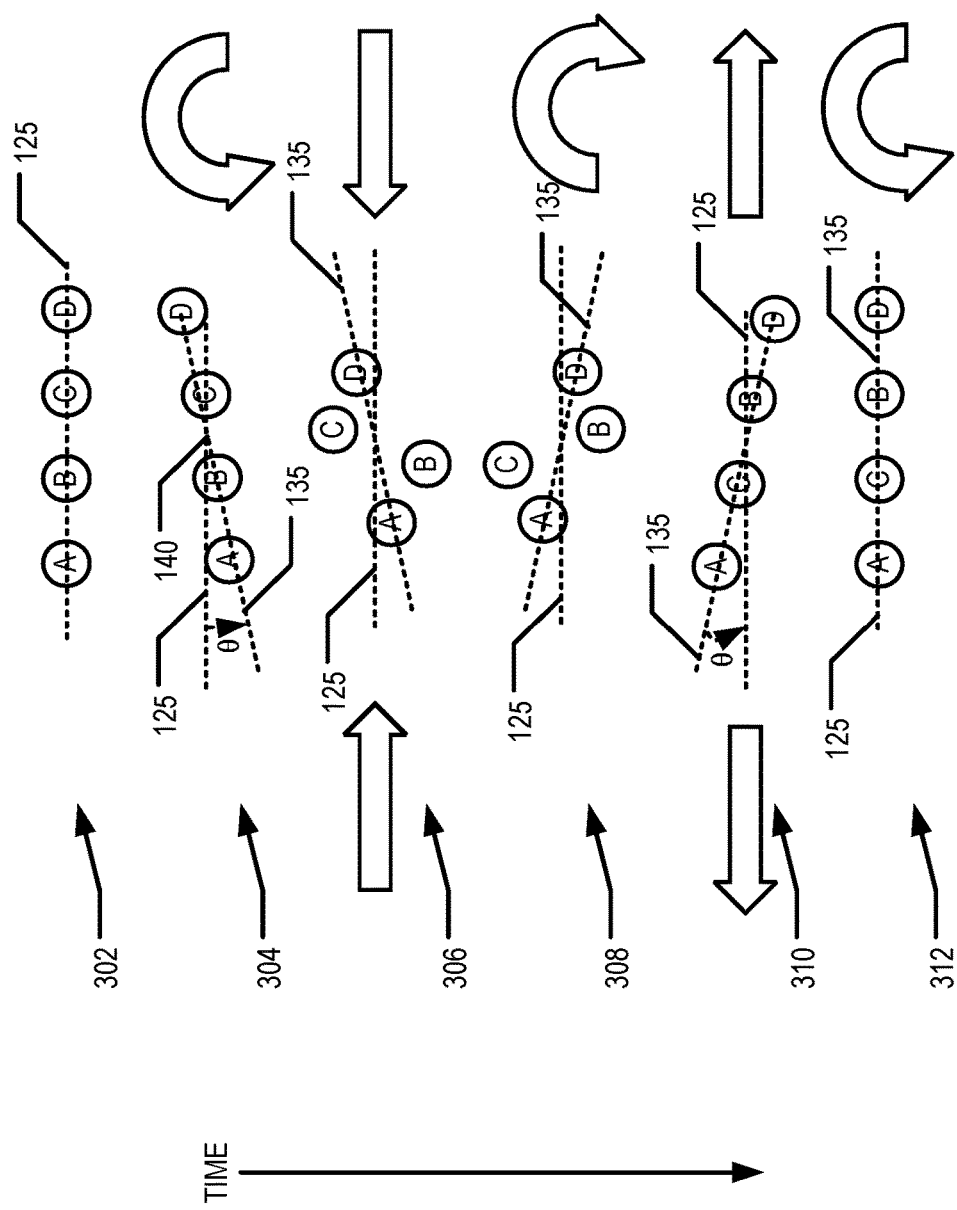
FIG. 3 is a schematic diagram illustrating a set of atomic object trajectories of a group of atomic objects for reordering Object B and Object C when the initial state and the final state of the group of atomic objects are a first configuration in which Object B and Object C are adjacent to one another and disposed between Object A and Object D, in accordance with an example embodiment.
Figure 4:
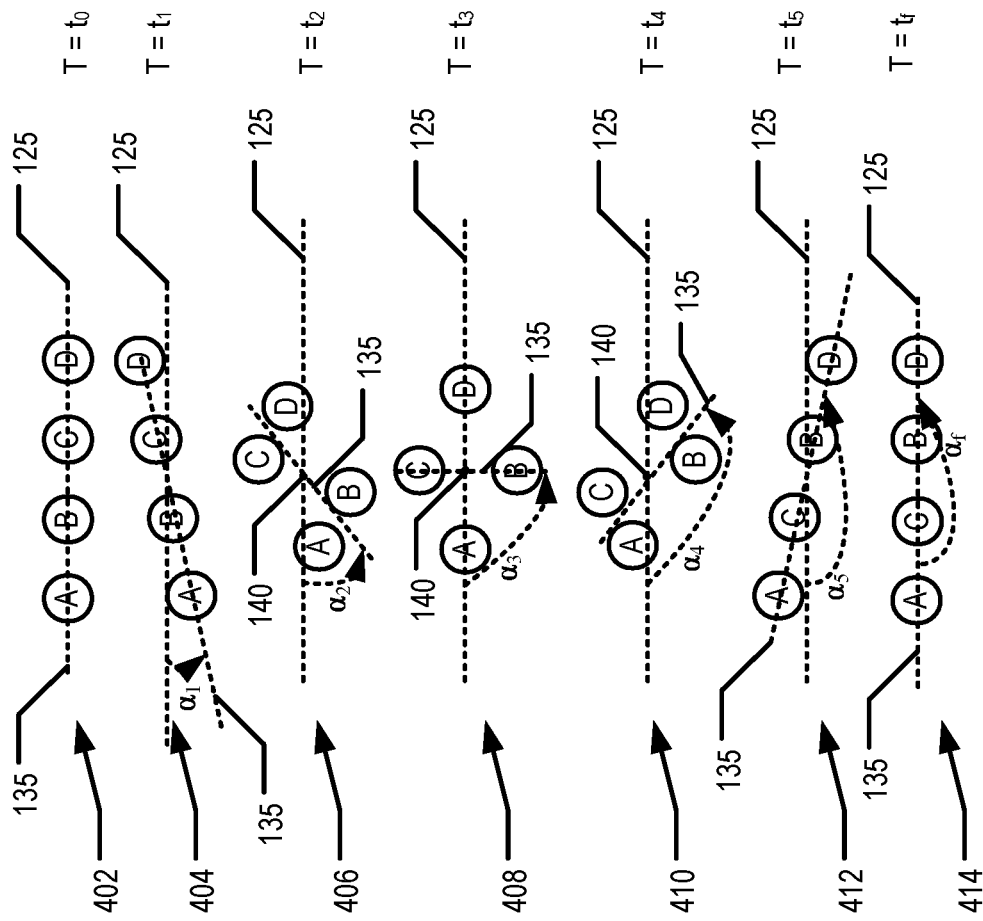
FIG. 4 is a schematic diagram illustrating another set of atomic object trajectories of a group of atomic objects for reordering Object B and Object C when the initial state and the final state of the group of atomic objects are the first configuration, in accordance with an example embodiment.
Figure 5:
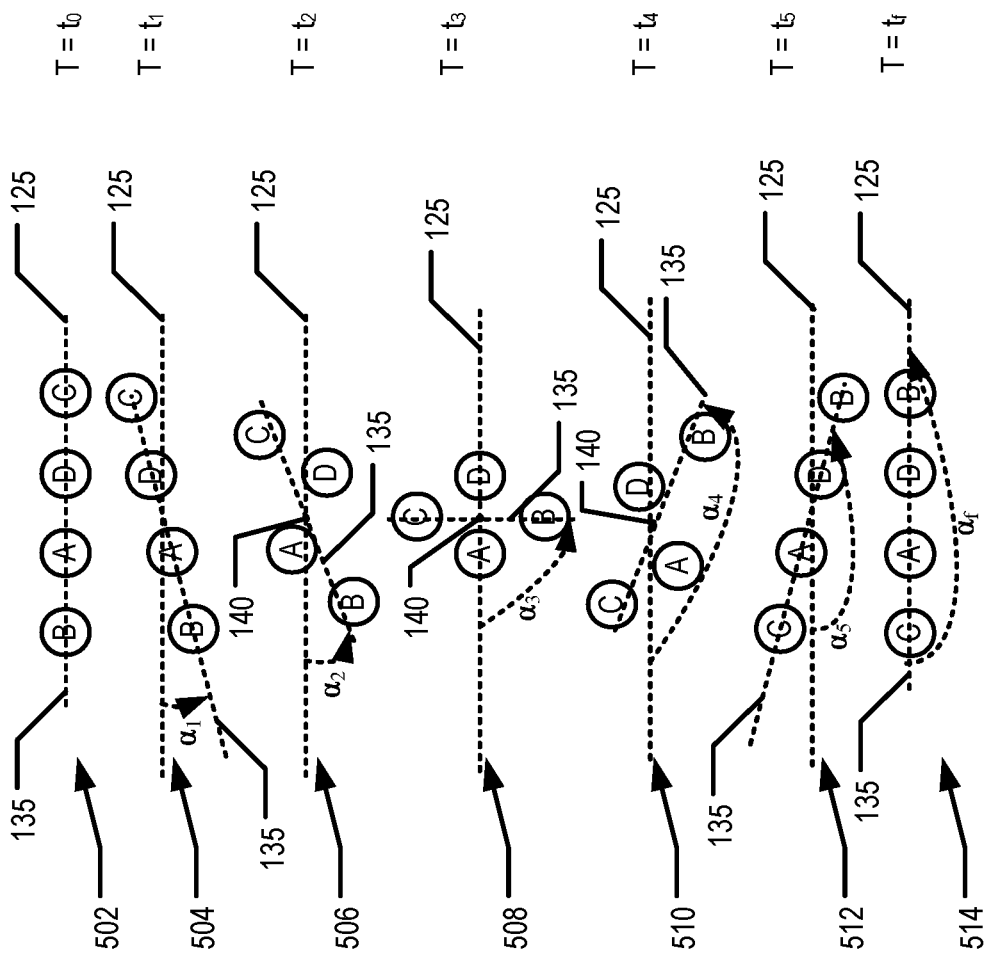
FIG. 5 is a schematic diagram illustrating a set of atomic object trajectories of a group of atomic objects for reordering Object B and Object C when the initial and the final state of the group of atomic objects is a second configuration in which Object A and Object D are adjacent to one another and disposed between Object B and Object C, in accordance with an example embodiment.
Figure 6:
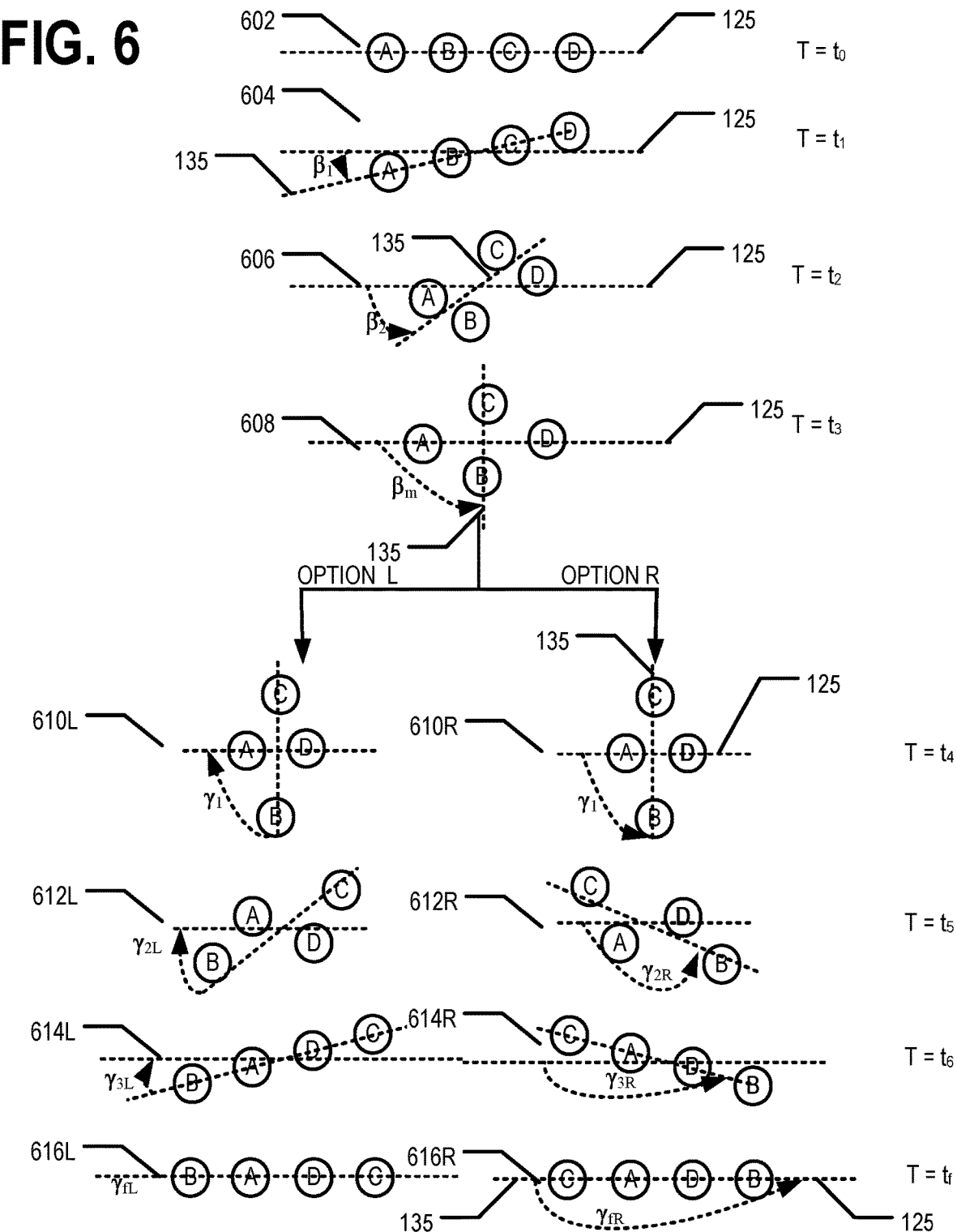
FIG. 6 is a schematic diagram illustrating sets of atomic object trajectories of a group of atomic objects for reshaping the group of atomic objects from an initial state that is one of the first configuration or the second configuration to a final state that is the other of the first configuration and the second configuration, in accordance with an example embodiment.

In various embodiments, the initial state of the group of atomic objects (e.g., before the reshaping and/or reordering function is performed) is one of a first or second configuration. In various embodiments, the final state of the group of atomic objects (e.g., after the reshaping and/or reordering function is performed) has an initial state which is one of the first or second configurations. In an example embodiment, when the group of atomic objects are in the first configuration, Object A, Object B, Object C, and Object D are in a plane (defined by the confinement apparatus, in an example embodiment) and in a chain (e.g., arranged in a line) aligned along an axis within the plane (defined by the confinement apparatus, in an example embodiment) with Object B and Object C adjacent to one another and disposed between Object A and Object D. As used herein, when first and second atomic objects are adjacent to one another, the first and second atomic objects are neighboring one another and/or next to one another such that there are no atomic objects disposed between the first and second atomic objects. For example panels 302, 312, 402, 414, and 602, as shown in FIGS. 3, 4, and 6, respectively, show the group of atomic objects in the first configuration. In an example embodiment, when the group of atomic objects are in the second configuration, Object A, Object B, Object C, and Object D are in a plane (defined by the confinement apparatus, in an example embodiment) and in a chain aligned along the axis within the plane (defined by the confinement apparatus, in an example embodiment) with Object A and Object D adjacent to one another and disposed between Object B and Object C. For example panels 502, 514, 616R, and 616L, as shown in FIGS. 5 and 6, respectively, show the group of atomic objects in the second configuration. In various embodiments, the spacing of the atomic objects in the initial and final state is controlled through a force balance between the electrostatic force pushing the atomic objects apart from one another and the confinement potential.

In various embodiments, the initial state of the group of atomic objects (e.g., before the reshaping and/or reordering function is performed) is one of a third or fourth configuration. In an example embodiment, when the group of atomic objects are in the third configuration, Object A, Object B, Object C, and Object D are in the plane (e.g., defined by the confinement apparatus) and in a chain (e.g., arranged in a line) along an axis within the plane (e.g., defined by the confinement apparatus) with Object B and Object C adjacent to one another and Object A and Object D adjacent to one another. Panel 702 of FIG. 3 shows the group of atomic objects in the third configuration. In an example embodiment, when the group of atomic objects are in the fourth configuration, Object A, Object B, Object C, and Object D are in the plane (e.g., defined by the confinement apparatus) and in a chain (e.g., arranged in a line) along an axis within the plane (e.g., defined by the confinement apparatus) with Object B and Object C not adjacent to one another and Object A and Object D not adjacent to one another. Panel 712 of FIG. 3 shows the group of atomic objects in the fourth configuration. In various embodiments, the deterministic reshaping and/or reordering function results in a final state of the group of atomic objects with the group of atomic objects in the third configuration or the fourth configuration.

In various embodiments, the deterministic reshaping and/or reordering functions may be performed to switch the position of Object B and Object C while maintaining the group of atomic objects in the first configuration (See FIGS. 3 and 4) or in the second configuration (See FIG. 5). For example, in various embodiments, the initial and final state of the reshaping and/or reordering function are the same of the first or second configuration but the positions of Object B and Object C are swapped. In various embodiments, the deterministic reshaping and/or reordering functions may be performed to switch the group of atomic objects from the first configuration to the second configuration, or vice versa (See FIG. 6).

In various embodiments, the confinement apparatus comprises a plurality of potential generating elements. For example, the potential generating elements may be caused to generate a time-dependent potential field that is experienced by the group of atomic objects (e.g., Object A, Object B, Object C, and Object D). The potential generating elements may be configured to generate a time-dependent potential field that causes each of the atomic objects of the group of atomic objects to traverse a particular trajectory such that the desired deterministic reshaping and/or reordering function is performed. In an example embodiment, the potential generating elements are electrodes configured to generate a time-dependent electric potential that is experienced by each atomic object (e.g., Object A, Object B, Object C, and Object D) of the group of atomic objects.

Exemplary Atomic Object Confinement Apparatus

Figure 1:
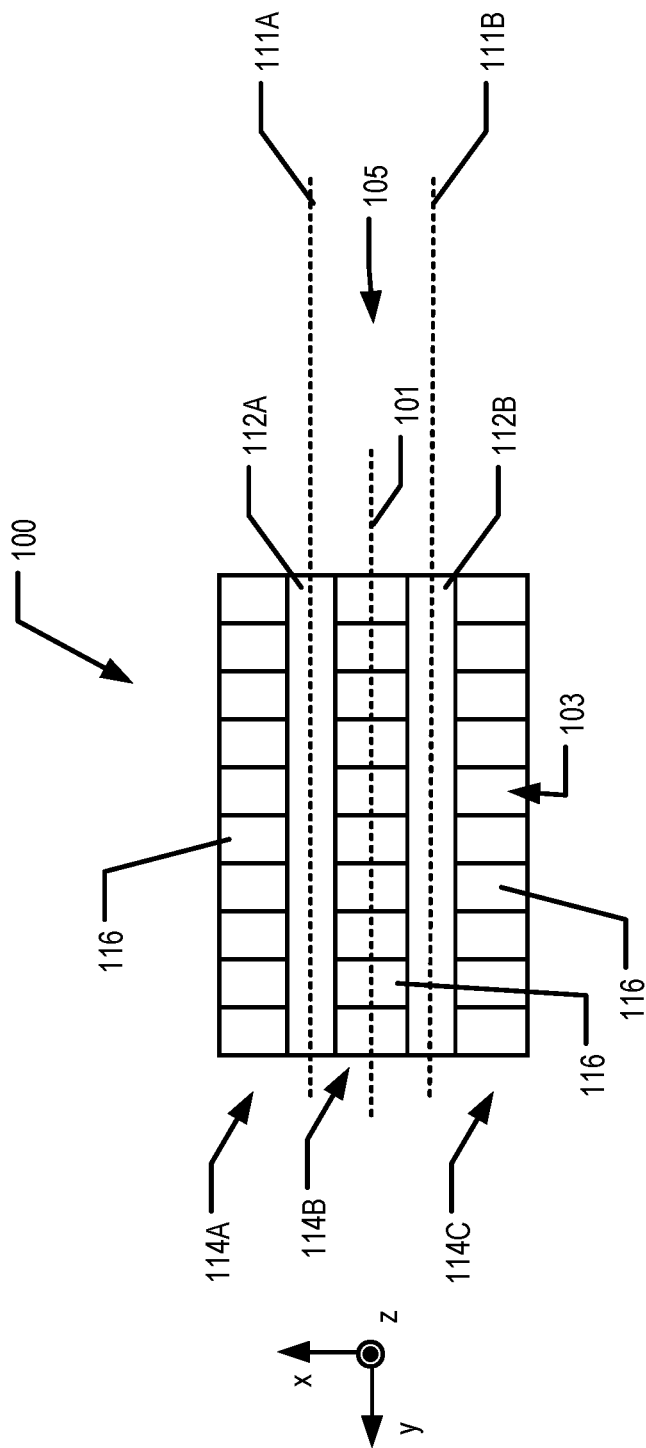

In an example embodiment, the confinement apparatus is an ion trap (e.g., a surface ion trap), the potential generating elements are electrodes of the ion trap, and the atomic objects are ions. FIG. 1 provides a top schematic view of an example surface ion trap 100. In an example embodiment, the surface ion trap 100 is fabricated as part of an ion trap chip and/or part of an ion trap apparatus and/or package. In an example embodiment, the surface ion trap 100 is at least partially defined by a number of radio frequency (RF) rails 112 (e.g., 112A, 112B). In various embodiments, the ion trap 100 is at least partially defined by a number of sequences of trapping and/or transport (TT) electrodes 114 (e.g., 114A, 114B, 114C). In an example embodiment, the ion trap 100 is a surface Paul trap with symmetric RF rails. In various embodiments, the potential generating elements of the confinement apparatus comprise the TT electrodes 116 of the sequences of TT electrodes 114 and/or the RF rails 112. In various embodiments, the upper surface of the ion trap 100 has a planarized topology. For example, the upper surface of each RF rail 112 of the number of RF rails 112 and the upper surface of each TT electrode 116 of the number of sequences of TT electrodes 114 may be substantially coplanar.

In various embodiments, the ion trap 100 comprises and/or is at least partially defined by a number of RF rails 112. The RF rails 112 are formed with substantially parallel longitudinal axes 111 (e.g., 111A, 111B) and with substantially coplanar upper surfaces. For example, the RF rails 112 are substantially parallel such that a distance between the RF rails 112 is approximately constant along the length of the RF rails 112 (e.g., the length of an RF rail being along the longitudinal axes 111 of RF rail 112). For example, the upper surfaces of the RF rails 112 may be substantially flush with the upper surface of the ion trap 100. In an example embodiment, the number of RF rails 112 comprises two RF rails 112 (e.g., 112A, 112B). In various embodiments, the ion trap 100 may comprise a plurality of number of RF rails 112. For example, the ion trap 100 may be a two-dimensional ion trap that comprises multiple numbers (e.g., pairs and/or sets) of RF rails 112 with each number (e.g., pair and/or set) of RF rails 112 having substantially parallel longitudinal axes 111. In an example embodiment, a first number of RF rails 112 have mutually substantially parallel longitudinal axes 111, a second number of RF rails 112 have mutually substantially parallel longitudinal axes 111, and the longitudinal axes of the first number of RF rails and the longitudinal axes of the second number of RF rails are substantially non-parallel (e.g., transverse). FIG. 1 illustrates an example one dimensional ion trap 100 having two RF rails 112, though other embodiments may comprise additional RF rails in various configurations.

In various embodiments, two adjacent RF rails 112 may be separated (e.g., insulated) from one another by a longitudinal gap 105. For example, the longitudinal gap may define (in one or two dimensions) the confinement channel or region of the ion trap 100 in which one or more atomic objects (e.g., ions in the case of the confinement apparatus being an ion trap 100) may be trapped at various locations within the ion trap. In various embodiments, the longitudinal gap 105 defined thereby may extend substantially parallel to the longitudinal axes 111 of the adjacent RF rails 112. For example, the longitudinal gap 105 may extend substantially parallel to the y-axis. In an example embodiment, the longitudinal gap 105 may be at least partially filled with an insulating material (e.g., a dielectric material). In various embodiments, the dielectric material may be silicon dioxide (e.g., formed through thermal oxidation) and/or other dielectric and/or insulating material. In various embodiments, the longitudinal gap 105 has a height (e.g., in the x-direction) of approximately 40 µm to 500 µm. In various embodiments, one or more sequences of TT electrodes 114 (e.g., a second sequence of TT electrodes 114B) may be disposed and/or formed within the longitudinal gap 105.

In an example embodiment, a transverse gap may exist between neighboring and/or adjacent electrodes 116 of the one or more sequences of electrodes 114. In an example embodiment, the transverse gap may be empty space and/or at least partially filled with a dielectric material to prevent electrical communication between neighboring and/or adjacent electrodes. In an example embodiment, the transverse gap between neighboring and/or adjacent electrodes may be in the range of approximately 1-10 µm.

In an example embodiment, a longitudinal gap exists between a sequence of TT electrodes 114 and a neighboring and/or adjacent RF rail 112. In an example embodiment, the longitudinal gap may be at least partially filled with a dielectric and/or insulating material to prevent electrical communication between TT electrodes 116 of the sequence of electrodes 114 and the RF rail 112. In an example embodiment, the longitudinal gap between neighboring and/or adjacent electrodes may be in the range of approximately 1-10 µm.

In various embodiments, the ion trap 100 may be at least partially defined by a number of sequences of TT electrodes 114 (e.g., first sequence of TT electrodes 114A, second sequence of electrodes 114B, third sequence of TT electrodes 114C). Each sequence of TT electrodes 114 is formed to extend substantially parallel to the substantially parallel longitudinal axes 111 of the RF rails 112. For example, the number of sequences of TT electrodes 114 may extend substantially parallel to the y-axis as shown in FIG. 1. In various embodiments, the number of sequences of TT electrodes 114 comprises two, three, four, and/or another number of sequences of TT electrodes 114. In an example embodiment, the ion trap 100 comprises a plurality of number of sequences of TT electrodes 114. For example, the illustrated ion trap 100 is a one-dimensional ion trap comprising three sequences of TT electrodes 114. For example, the ion trap 100 may be a two-dimensional ion trap that comprises multiple numbers of sequences of TT electrodes 114 that each extend substantially parallel to a substantially parallel longitudinal axes of a corresponding number of RF rails 112. In an example embodiment, a first number of sequences of TT electrodes 114 extend substantially parallel to the substantially parallel longitudinal axes 111 of a first number of RF rails 112, a second number of sequences of TT electrodes 114 extend substantially parallel to the substantially parallel longitudinal axes 111 of a second number of RF rails 112, and the longitudinal axes of the first number of RF rails and the longitudinal axes of the second number of RF rails are substantially non-parallel (e.g., transverse). In some embodiments, each of the TT electrodes 116 of the number of sequences of TT electrodes 114 can be formed with substantially coplanar upper surfaces that are substantially coplanar with the upper surfaces of the RF rails 112.

In an example embodiment (e.g., as illustrated in FIGS. 3-5), a number (e.g., pair) of RF rails 112 may be formed between a first sequence of TT electrodes 114A and a third sequence of TT electrodes 114C with a second sequence of TT electrodes 114B extending along the longitudinal channel 105 between the RF rails 112. For example, each sequence of TT electrodes 114 may extend in a direction substantially parallel to the longitudinal axes 111 of the RF rails (e.g., in the y-direction). In various embodiments, the upper surfaces of the sequences of TT electrodes 114 are substantially coplanar with the upper surfaces of the RF rails 112.

In various embodiments, RF signals may be applied to the RF rails 112 to generate an electric and/or magnetic field that acts to maintain an ion trapped within the ion trap 100 in directions transverse to the longitudinal direction of the ion trap 100 (e.g., the x- and z-directions). In various embodiments, TT voltages may be applied to the TT electrodes 116 to generate a time-dependent electric potential field that causes the objects of the group of objects to traverse corresponding trajectories to perform a deterministic reshaping and/or reordering function. In various embodiments, the number of sequences of TT electrodes 114 may, in combination, be biased, with TT voltages that contribute to a variable combined electrical and/or magnetic field to trap at least one ion in a potential well above at least one of either an upper surface of the sequences of TT electrodes 114 and/or the RF rails 112. In various embodiments, the potential experienced by an ion with the ion trap 100 may be a combination of a static and/or non-rotating potential (e.g., a confinement potential which defines confinement potential axis 125 which may be substantially parallel and/or colinear with the trap axis 101, in various embodiments) and a rotating potential (e.g., which defines rotating potential axis 135). In an example embodiment, the potential experienced by an ion with the ion trap 100 may further include a radial push potential. For example, the electrical and/or magnetic field generated at least in part by voltages applied to the TT electrodes of the sequences of TT electrodes 114 may trap at least one ion in a potential well above the upper surface of the second sequence of TT electrodes 114B and/or the longitudinal gap 105. Additionally, the TT voltages applied to the electrodes 116 may cause ions trapped within the potential well above the upper surface of the second sequence of TT electrodes 114B and/or the longitudinal gap 105 to traverse trajectories such that a deterministic reordering and/or reshaping function is performed.

Figure 9:
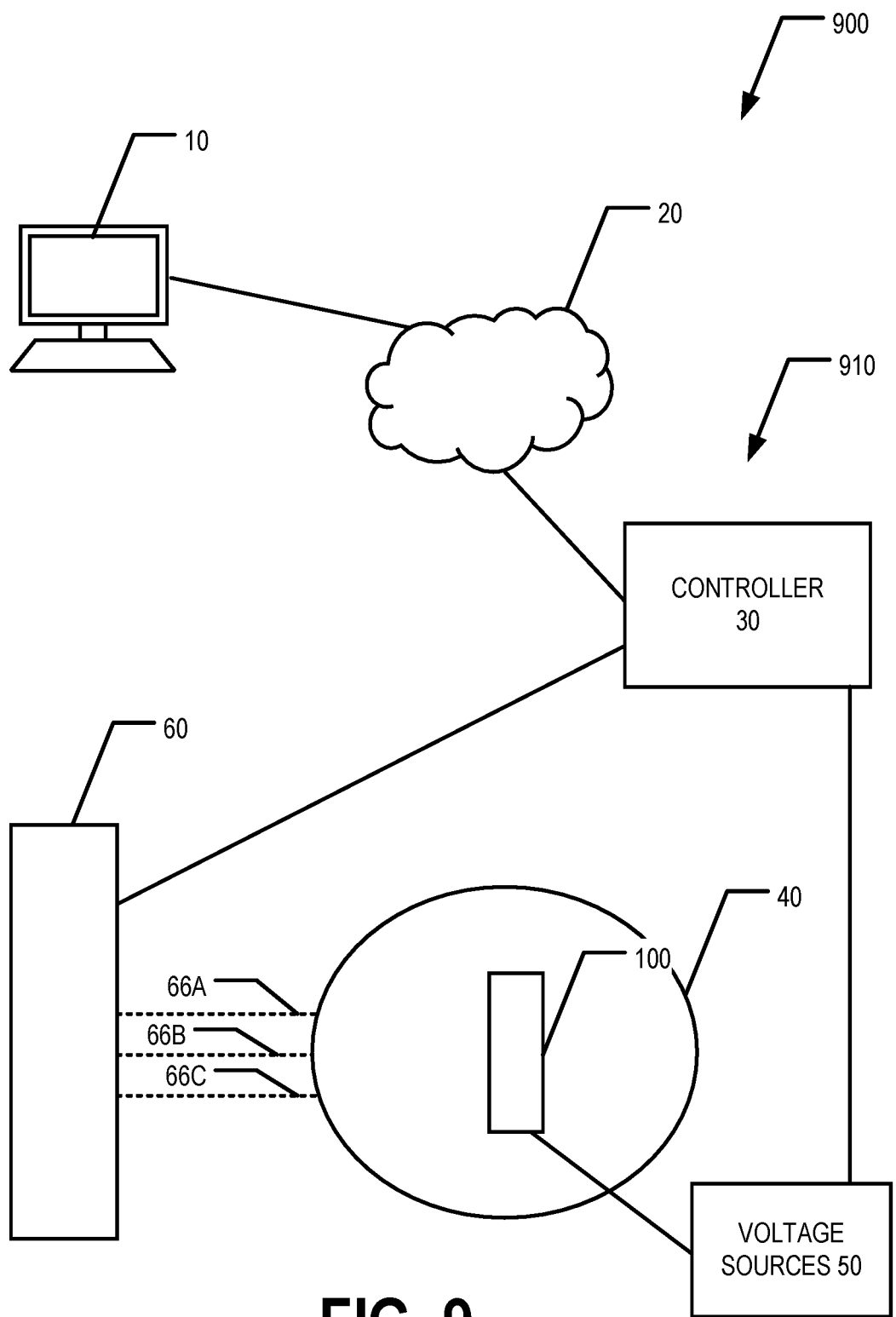
FIG. 9 is a schematic diagram illustrating an example quantum computing system configured to perform one or more deterministic reshaping and/or reordering functions, according to various embodiments.

In various embodiments, the TT voltages applied to the TT electrodes 116 are controlled by one or more connected devices (e.g., a controller 30 as shown in FIG. 9 and/or the like) via leads. For example, depending on the positive or negative charge on the at least one ion, TT voltages may be raised or lowered for TT electrodes 116 in the vicinity of a particular ion to cause the particular ion to traverse a desired trajectory. For example, a controller 30 may control a voltage driver to cause the voltage driver to apply TT voltages to the TT electrodes to generate a time-dependent electric potential (e.g., an electric potential that evolves with time) that causes the ions of the group of atomic objects to traverse the desired trajectories to cause a deterministic reshaping and/or reordering function to be performed.

Depending on such factors as the charge on the at least one ion and/or the shape and/or magnitude of the combined electrical and/or magnetic fields, the at least one ion can be stabilized at a particular distance (e.g., approximately 20 µm to approximately 200 µm) above an upper surface of the ion trap 100 (e.g., the coplanar upper surface of the sequences of TT electrodes 114 and RF rails 112). To further contribute to controlling the transit of ions along desired trajectories, the ion trap 100 may be operated within a cryogenic and/or vacuum chamber capable of cooling the ion trap to a temperature of less than 124 Kelvin (e.g., less than 100 Kelvin, less than 50 Kelvin, less than 10 Kelvin, less than 5 Kelvin, and/or the like), in various embodiments.

In various embodiments, the RF rails 112, the sequences of electrodes 114, and/or the confinement potential generated by the RF rails and/or the sequences of electrodes 114 define a confinement plane 103 of the ion trap. In various embodiments, the RF rails 112, the sequences of electrodes 114, and/or the confinement potential generated by the RF rails and/or the sequences of electrodes 114 define an axis 101 of the ion trap.

In various embodiments, the atomic objects within the ion trap 100 experience a confinement potential generated by the RF rails 112 and a TT potential generated by the TT electrodes 116. In various embodiments, the confinement potential generally acts to align the atomic objects within the ion trap 100 within the longitudinal gap 105 and/or along the ion trap axis 101. For example, the confinement potential may be generally tube and/or cigar shaped to confine the atomic objects within the longitudinal gap 105, in an example embodiment. In various embodiments, the confinement potential may not change while a reshaping and/or reordering function is being performed. For example, the confinement potential may be approximately constant with respect to time during the performance of a reshaping and/or reordering function. The TT potential, generated by applying sequences of voltages to the TT electrodes 116, is configured to cause the atomic objects to move through the combined potential (e.g., the potential experienced by the atomic objects as result of the superposition of the confinement potential and the TT potential) to perform the reshaping and/or reordering function. For example, sequences of voltages may be applied to the TT electrodes 116 to cause minima in the combined potential at particular positions at particular times such that the minima in the combined potential guide the atomic objects through the trajectories corresponding to the reshaping and/or reordering function. In various embodiments, the non-rotating potential (e.g., which defines the confinement potential axis 125) comprises the confinement potential and, potentially, a portion of the TT potential. In various embodiments, the rotating potential (e.g., which defines the rotating potential axis 135) comprises at least a portion of the TT potential.

Exemplary Method for Performing a Reshaping and/or Reordering Function

In various embodiments, a controller 30 may control one or more drivers to cause a plurality of potential generating elements of a confinement apparatus to generate a time-dependent potential field (e.g., a potential field that evolves with time) that causes the atomic objects of the group of atomic objects to traverse desired trajectories such that a deterministic reshaping and/or reordering function is performed. In various embodiments, the controller 30 may determine the driver action sequences (e.g., TT voltages to be applied to the electrodes 116, in the example embodiment where the confinement apparatus is the ion trap 100). For example, the controller 30 may cause a quantum circuit and/or algorithm to be performed and may determine the driver action sequences based on or more steps, gates, and/or the like of the quantum circuit and/or algorithm to be performed. In various embodiments, another computing entity may determine the driver action sequences provide the driver action sequences to the controller 30.

Figure 2:
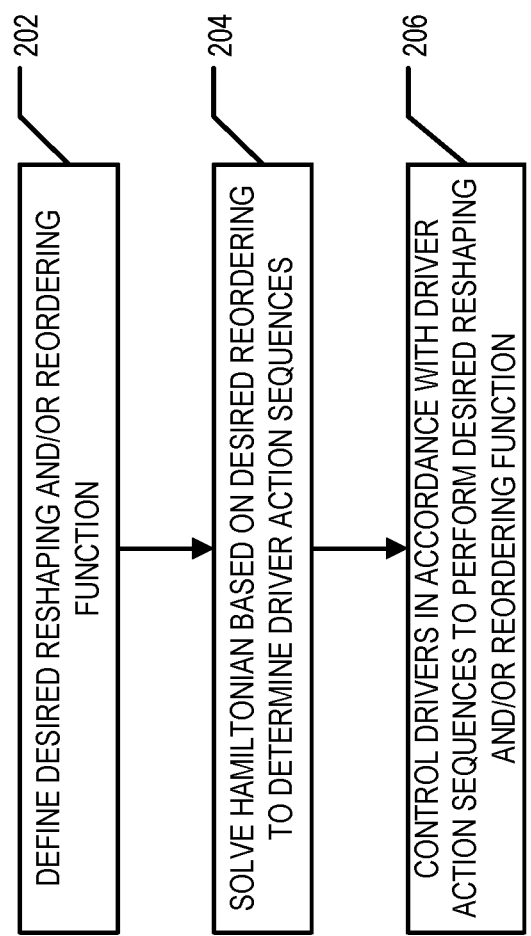
FIG. 2 is a flowchart of various processes, procedures, and/or operations that may be performed, for example, by a controller of the atomic object confinement apparatus, to perform a deterministic reshaping and/or reordering of a group of atomic objects within an atomic object confinement apparatus, in accordance with an example embodiment.

FIG. 2 provides a flowchart illustrating example processes, procedures, operations, and/or the like that may be performed by a controller 30, for example, to cause a deterministic reshaping and/or reordering function to be performed. Starting at step/operation 202, a desired reshaping and/or reordering function may be defined. For example, the controller 30 (e.g., using processing device 1005 shown in FIG. 10) may read a quantum circuit and/or algorithm which defines and/or indicates that a reshaping and/or reordering function should be performed. For example, based on the quantum circuit and/or algorithm, initial and final states (e.g., order of the atomic objects within the atomic object confinement apparatus 100) may be determined. The controller 30 may, responsive to reading the quantum circuit and/or algorithm, identify and/or define a reshaping and/or reordering function to be performed as part of the execution of the quantum circuit and/or algorithm. In an example embodiment, the controller 30 comprises memory 1010 (shown in FIG. 10) that stores sets of trajectories corresponding to various reshaping and/or reordering functions that may be performed. FIGS. 3, 4, 5, and 6 illustrate some example trajectories for performing some example deterministic reshaping and/or reordering functions, according to some example embodiments.

At step/operation 204, the controller 30 (or another computing entity) may solve a Hamiltonian and/or the like based on the trajectories and/or initial state and final state corresponding to the reshaping and/or reordering function defined and/or identified at step/operation 202 (e.g., and accessed from memory 1010). In various embodiments, the controller 30 (e.g., using processing device 1005) solves a Hamiltonian and/or the like based on the on the trajectories and/or initial and final states corresponding to the reshaping and/or reordering function defined and/or identified at step/operation 202 to determine the driver action sequences. In an example embodiment, (e.g., wherein the confinement apparatus is ion trap 100) the driver action sequences are sequences of TT voltages to be applied to the electrodes 116. In an example embodiment, rather than solving a Hamiltonian for a particular set of trajectories, sequences of TT voltages may be solved for such that one or more minima of the potential field (e.g., generated by a combination of the voltages applied to the electrodes 116 and the potential generated by the RF rails 112) move along desired trajectories. For example, the Hamiltonian and/or the like may be solved for a time dependent potential field comprising the time independent confinement potential, a time dependent rotating potential, and, in some instances, a time dependent radial push potential.

At step/operation 206, the controller 30 may control one or more drivers (e.g., voltage drivers 50 shown in FIG. 9 using, for example driver, controller elements 1010 shown in FIG. 10) to cause the one or more drivers to perform the driver action sequences. For example, the controller 30 may cause voltage drivers to provide the driver action sequences (e.g., sequences of TT voltages) to be applied to the potential generating elements (e.g., electrodes 116). Responsive to receiving the driver action sequences, the potential generating elements may generate a time-dependent potential field that is experienced by the atomic objects of the group of atomic objects. Experiencing the time-dependent potential field causes each of the atomic objects of the group of atomic objects to traverse a corresponding trajectory such that the deterministic reshaping and/or reordering function defined and/or identified in step/operation 202 is performed. For example, the application of the driver action sequences to the potential generating elements may generate a time-dependent potential field that causes the group of atomic objects (e.g., Object A, Object B, Object C, and Object D) to traverse trajectories starting from the initial state through to a final state. In various embodiments, the atomic objects move through the time-dependent potential field in a plane (e.g., a confinement plane parallel to the ion trap plane 103). In various embodiments, the trajectories traversed by the atomic objects include portions that are out of the plane. For example, the atomic objects, while traversing the trajectories, may have velocity components that are transverse to the confinement plane and/or ion trap plane 103. For example, the first and second directions of rotation are described herein as being in the plane (e.g., the confinement plane parallel to the ion trap plane 103). However, the rotations described herein may have components that are transverse to the plane (e.g., the confinement plane).

FIGS. 3, 4, 5, 6, 7 and 8 each illustrate an example deterministic reshaping and/or reordering function. Each of FIGS. 3, 4, 5, 6, 7, and 8 include an arrow indicating the flow of time through the sequence of panels depicting snap shots of the trajectories of the atomic objects during various steps of example deterministic reshaping and/or reordering functions. As should be understood, each of the example deterministic reshaping and/or reordering functions may be performed in the direction opposite that of the time arrow to perform an inverse function to the illustrated function.

A First Example Deterministic Reshaping and/or Reordering Function

FIG. 3 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In various embodiments, the atomic objects of the group of atomic objects traverse the corresponding trajectories responsive to experiencing a time-dependent potential field generated by the potential generating elements.

Panel 302 illustrates the initial state of a group of atomic objects. In the initial state, the group of atomic objects are in an initial chain in the first configuration. When the group of atomic objects are in the first configuration, Object A, Object B, Object C, and Object D are in a plane (defined by the confinement apparatus, in an example embodiment) and in a chain aligned along a confinement potential axis 125 within the plane (defined by the confinement apparatus, in an example embodiment) with Object B and Object C adjacent to one another and disposed between Object A and Object D. In an example embodiment, the confinement potential axis 125 is substantially aligned with the ion trap axis 101. In an example embodiment, the confinement potential axis 125 is an axis and/or line that is substantially parallel to the ion trap axis 101 and that passes through the point that is equidistant between Object B and Object C. For example, the confinement potential axis 125 may be substantially parallel and/or colinear to the ion trap axis 101. In an example embodiment, the rotating potential axis 135 rotates about a center point 140 of the group of atomic objects. For example, the center point 140 of the group of atomic objects may be a center of mass of the group of atomic objects or an average position (e.g., not weighted based on mass) of the atomic objects in the group of atomic objects. As noted above, Object B and Object C are of the first atomic object type and Object A and Object D are not of the first atomic object type. Object B and Object C have larger masses than Object A and Object D. In an example embodiment, Object A and Object D are of the same atomic object type as one another, which is a different atomic object type than the first atomic object type. In an example embodiment, at the initial state of the group of atomic objects, the confinement potential dominates the potential experienced by the atomic objects within the confinement apparatus. For example, the confinement ratio, the ratio of the strength of the confinement potential (e.g., generated by the voltages applied to the RF rails 112) to the TT potential, is X:1, where X is greater than 1, while the group of atomic objects are in the initial state. For example, X is such that the voltages applied to the RF rails 112 and the voltages applied to the TT electrodes 116 are within the stability region for the ion trap 100, in an example embodiment. In general, the stability region for the ion trap 100 is defined based on the geometry of the ion trap 100. For example, the stability region may be the first stability region and may be a voltage region for the ion trap 100 in which ions may be trapped within the ion trap 100 in a stable manner. For example, X may be a value that is greater than one such that there is a preferred direction of confinement within the ion trap 100 (e.g., along and/or substantially parallel to the axis 101) and such that trapping within the ion trap 100 is viable.

In an example embodiment, the potential generating elements generate a potential field that causes the atomic objects of the group of atomic objects to traverse trajectories such that the atomic objects move through the positions shown in Panels 304, 306, 308, 310, and reach the final state shown in Panel 312. Though Panels 304, 306, 308, and 310 are split out to show different steps in the movement of the atomic objects, some of these steps may occur simultaneously, in various embodiments. For example, in an example embodiment, the steps shown in Panels 304 and 306 occur simultaneously and/or the steps shown in Panels 308 and 310 occur simultaneously.

Between Panel 302 and Panel 304, the time-dependent potential field causes the initial chain (e.g., comprising the aligned atomic objects of the group of atomic objects) to rotate in a first direction through a first angle θ to form a rotated chain. In various embodiments, the initial chain is rotated about the center point 140 in the first direction through the first angle θ to form the rotated chain. The first direction is in the plane. For example, the initial chain may be rotated such that the rotated initial chain forms a first angle θ with the confinement potential axis 125. In various embodiments, the first angle θ is greater than 0° and less than 90°. In an example embodiment, the first angle θ is in the range of approximately 5°-15°. In an example embodiment, one of the exterior atomic objects (e.g., Object A or Object D in the first configuration) is used as the rotation point about which the initial chain is rotated.

Between Panel 304 and Panel 306, the time-dependent potential field causes the rotated initial chain (e.g., comprising the aligned atomic objects of the group of atomic objects) to be compressed to form a compressed arrangement of the group of atomic objects. For example, the potential generating elements may be controlled (e.g., by the controller 30) to generate a compression potential that causes the group of atomic objects to be compressed along the confinement potential axis. For example, the compression potential may cause the atomic objects to feel a push in the direction of the confinement potential axis 125 that is outward from a point interior to the group of atomic objects (e.g., a point located along the confinement potential axis and between Objects B and C). For example, the rotated initial chain may be compressed along the confinement potential axis 125. For example, the confinement ratio, the ratio of the strength of the confinement potential to the TT potential, may be reduced to Y:1, where Y may approach 1 and/or be less than 1. For example, as shown in Panel 306, the confinement ratio may be in the range of approximately 1.2:1 to 0.8:1. In an example embodiment, the confinement ratio is decreased by increasing the strength of the TT potential. For example, in an example embodiment, the confinement potential generated by applying voltages to the RF rails 112 may be approximately constant with time (e.g., a time average of the confinement potential over a first period of time may be approximately equal to a time average of the confinement potential over a second period of time). In an example embodiment, compressing the rotated initial chain causes Object B and Object C to be moved to opposite sides of the confinement potential axis 125.

Between Panel 306 and 308, the time-dependent potential field causes the compressed arrangement of the group of atomic objects to be rotated in a second direction through a second angle to form a rotated compressed arrangement of the group of atomic objects. In an example embodiment, the second angle is two times the first angle θ. For example, in Panel 306, the angle between the confinement potential axis 125 and the rotating potential axis 135 is the first angle θ and, in Panel 308, the angle between the confinement potential axis 125 and the rotating potential axis 135 is the negative of the first angle (e.g., −θ). For example, between Panel 306 and Panel 308, the axis of the rotating potential rotates by an angle of 2θ in the second direction. The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane. In an example embodiment, the rotation of the compressed arrangement of the group of atomic objects is rotated around a point located at the center of the group of atomic objects (e.g., center point 140) to form the rotated compressed arrangement. In an example embodiment, the center of the group of atomic objects is the point where a virtual line connecting Object A and Object D and a virtual line connecting Object C and Object B intersect.

Between Panels 308 and 310, the time-dependent potential field causes the rotated compressed arrangement of the group of atomic objects to be decompressed to form an off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects B and C). For example, the confinement ratio may be increased to X:1, where X is greater than 1. For example, X may be in the range of approximately 1.5 to 4.0, in an example embodiment. In an example embodiment, the confinement ratio is increased by decreasing the strength of the TT potential. For example, the rotated compressed arrangement of the group of atomic objects may be decompressed or extended along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain.

Between Panels 310 and 312, the time-dependent potential field causes the off-axis final chain to rotate in the first direction through the first angle θ to form a final chain. The first direction is in the plane. For example, the off-axis chain may be rotated such that the atomic objects in the final chain are aligned along the confinement potential axis 125. In an example embodiment, the off-axis final chain is rotated about the center point 140 to form the final chain. In an example embodiment, the confinement ratio experienced by the final chain is approximately the same as the confinement ratio experienced by the initial chain.

As can be seen in Panel 312, the final chain is of a first configuration in which Object B and Object C are adjacent to one another and disposed between Object A and Object D, in accordance with an example embodiment. However, Object B and Object C have changed positions between the initial chain and the final chain. For example, the initial chain may be ordered Object A, Object B, Object C, Object D and the final chain may be ordered Object A, Object C, Object B, Object D.

In various embodiments, the atomic objects experience heating (e.g., the gaining of thermal energy) due to the confinement potential when they are not located along the ion trap axis 101. This heating mechanism is referred to as RF heating herein. The further from the ion trap axis 101 an atomic object is, the more RF heating the atomic object experiences. The example deterministic reshaping and/or reordering function illustrated in FIG. 3 maintains all of the atomic objects closer to the ion trap axis 101 (e.g., which is approximately aligned with the confinement potential axis 125) than a simple 180° rotation of the initial chain to form the final chain. Thus, the RF heating experienced by the atomic objects when the deterministic reshaping and/or reordering function illustrated in FIG. 3 is performed is significantly less than the RF heating experienced by atomic objects when a simple 180° rotation is performed. Additionally, the voltages applied to perform the deterministic reshaping and/or reordering function illustrated in FIG. 3 requires lower voltages than is generally necessary to perform a simple 180° rotation of the initial chain to form the final chain.

In various embodiments, the time-dependent potential may act to compress and rotate or decompress and rotate the atomic objects in time-overlapping manner. For example, the compression of the rotated initial chain and the continued rotation of the atomic objects about the center point 140 may occur simultaneously, semi-simultaneously, and/or the like. For example, the compression may occur while the rotation is continuing. Similarly, the decompression of the atomic objects and the rotation of the atomic objects may occur in a time-overlapping manner. For example, once the rotation of the atomic objects has been initiated (e.g., during an early portion of the rotation), the confinement ratio may be adjusted from X:1 to Y:1. The confinement ratio may then be maintained at Y:1 for a middle portion of the rotation of the atomic objects, and then adjusted from Y:1 to X:1 during an ending portion of the rotation.

Another Example Deterministic Reshaping and/or Reordering Function

FIG. 4 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In various embodiments, the atomic objects of the group of atomic objects traverse the corresponding trajectories responsive to experiencing a time-dependent potential field generated by the potential generating elements.

Panel 402 illustrates the initial state of a group of atomic objects at an initial time T=$t_0$. In the initial state, the group of atomic objects are in an initial chain in the first configuration. When the group of atomic objects are in the first configuration, Object A, Object B, Object C, and Object D are in a plane (defined by the confinement apparatus, such as ion trap plane 103, in an example embodiment) and in a chain aligned along a confinement potential axis 125 within the plane (defined by the confinement apparatus, in an example embodiment) with Object B and Object C adjacent to one another and disposed between Object A and Object D. In an example embodiment, the confinement potential axis 125 is substantially aligned with the ion trap axis 101. As noted above, Object B and Object C are of the first atomic object type and Object A and Object D are not of the first atomic object type. In an example embodiment, Object A and Object D are of the same atomic object type as one another, which is a different atomic object type than the first atomic object type. In an example embodiment, at the initial state of the group of atomic objects, the confinement potential dominates the potential experienced by the atomic objects within the confinement apparatus. For example, the confinement ratio, the ratio of the strength of the confinement potential to the TT potential, is X:1, where X is greater than 1, while the group of atomic objects are in the initial state. For example, X may be in a range such that the confinement potential is within the stability region for the ion trap 100, in an example embodiment.

In an example embodiment, the potential generating elements generate a potential field that causes the atomic objects of the group of atomic objects to traverse trajectories such that the atomic objects move through the positions shown in Panels 404, 406, 408, 410, 412, and reach the final state shown in Panel 414 at final time $T=t_f$. Between Panel 402 and Panel 404, the time-dependent potential field causes the initial chain (e.g., comprising the aligned atomic objects of the group of atomic objects) to rotate in a first direction through rotation angle $\alpha_1$ to form a rotated chain at time $T=t_1$. The first direction is in the plane. For example, the initial chain may be rotated as the rotating potential axis 135 rotates through a rotation angle $\alpha_1$ with the confinement potential axis 125. In an example embodiment, the initial chain is rotated around the center point 140 of the group of atomic objects (e.g., the point where the confinement potential axis 125 intersects the rotating potential axis 135).

Between Panel 404 and Panel 406, the time-dependent potential field causes the rotated initial chain (e.g., comprising the aligned atomic objects of the group of atomic objects) to be compressed to form a compressed arrangement of the group of atomic objects. For example, the rotated initial chain may be compressed along the confinement potential axis 125. For example, the confinement ratio, the ratio of the strength of the confinement potential to the TT potential, may be reduced to Y:1, where Y may approach 1 and/or be less than 1. For example, as shown in Panel 406, the confinement ratio may be in the range of approximately 1.2:1 to 0.8:1. In an example embodiment, the confinement ratio is decreased by adjusting the strength of the TT potential. For example, the driver action sequences may be determined such that the TT potential rotates about the center point 140. Moreover, the driver action sequences may be determined such that the TT potential is sufficient to rotate Objects B and C about the center point 140, but, due to the mass difference between Objects B and C and Objects A and D, Objects A and D do not feel a sufficient force from the TT potential to cause rotation of Objects A and D about the center point 140. For example, Objects A, B, C, and D experience the confinement potential generated by RF rails 112 and the TT potential generated by applying voltages to the TT electrodes 116. The combined potential (e.g., the superposition of the confinement potential and the TT electrodes) is sufficient to cause atomic objects have masses similar to the mass of Objects B and C to rotate about the center point 140 but is not sufficient to cause atomic objects having masses similar to Objects A and D (e.g., which are less massive that Objects B and C) to rotate about the center point 140. In an example embodiment, the change in the confinement ratio and the change in the TT potential causes compression of the rotated initial chain and causes Object B and Object C to be moved to opposite sides of the confinement potential axis 125. For example, the potential generating elements may be controlled (e.g., by the controller 30) to generate a compression potential that causes the group of atomic objects to be compressed along the confinement potential axis. For example, the compression potential may cause the atomic objects to feel a push in the direction of the confinement potential axis 125 that is outward from a point interior to the group of atomic objects (e.g., a point located along the confinement potential axis and between Objects B and C). Object B and Object C may continue to rotate about the center point 140 due to the rotating potential. For example, at time $T=t_2$, the rotating potential axis 135 has rotated through a rotation angle of $\alpha_2$ such that the angle between the confinement potential axis 125 and the rotating potential axis 135 is rotation angle of $\alpha_2$.

Between Panel 406 and 410, the time-dependent potential field causes the compressed arrangement of the group of atomic objects to be rotated to form a rotated compressed arrangement of the group of atomic objects. In various embodiments, Objects B and C continue to be rotated in the first direction due to the continued rotation of the rotating potential. For example, the rotation angle α between the confinement potential axis 125 and the rotating potential axis 135 increases from $\alpha_2$ at time $T=t_2$, to $\alpha_3$ at time $T=t_3$, as shown in Panel 408, and $\alpha_4$ at time $T=t_4$, as shown in Panel 410. Objects A and D may be rotated in the second direction about a center of rotation 140 in response to experiencing the rotating potential. In an example embodiment, the center point 140, which acts as the center of rotation, is located at the intersection between the rotating potential axis and the confinement potential axis 125. The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane. Panel 408 shows an intermediate point in the rotation(s) between the compressed arrangement and the rotated compressed arrangement.

Between Panels 410 and 412, the time-dependent potential field causes the rotated compressed arrangement of the group of atomic objects to be decompressed to form an off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects B and C). For example, a change in the confinement ratio (e.g., the relative strength of the confinement potential to the rotating TT potential) may cause the rotated compressed arrangement of the group of atomic objects to decompress or extend along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain. For example, the confinement ratio may be increased to X:1, where X is greater than 1. For example, X may be in a range defined by the stability region of the ion trap 100, in an example embodiment. In an example embodiment, the confinement ratio is increased by adjusting the strength of the TT potential. Object B and Object C may continue to rotate about the center point 140 in the first direction in response to experiencing the rotating potential. For example, at time T=$t_4$, the rotating potential axis has rotated through a rotation angle of $\alpha_4$ such that the angle between the confinement potential axis 125 and the rotating potential axis 135 is rotation angle of $\alpha_4$. As Object A and Object D continue rotate around the center point 140 in the second direction, the off-axis final chain is formed at time T=$t_4$.

Between Panels 412 and 414, the time-dependent potential field causes the off-axis final chain to rotate in the first direction such the angle between the confinement potential axis 125 and the rotating potential axis 135 is a final rotation angle of $\alpha_f$ and a final chain is formed. For example, the final chain may be aligned along the confinement potential axis 125 and/or substantially aligned along the ion trap axis 101. In an example embodiment, the final rotation angle $\alpha_f$ is approximately 180°. The first direction is in the plane. For example, the off-axis chain may be rotated such that the atomic objects in the final chain are aligned along the confinement potential axis 125. In various embodiments, the center point 140 acts as the center of rotation. For example, the off-axis final chain is rotated around the center point 140 in the first direction to form the final chain.

As can be seen in Panel 414, the final chain is of a first configuration in which Object B and Object C are adjacent to one another and disposed between Object A and Object D, in accordance with an example embodiment. However, Object B and Object C have changed positions between the initial chain and the final chain. In various embodiments, Object A and Object D are in the same position in the final chain as in the initial chain, even though Object B and Object C have changed positions. For example, the initial chain may be ordered Object A, Object B, Object C, Object D and the final chain may be ordered Object A, Object C, Object B, Object D.

As should be understood from FIG. 4 and the above, Objects B and C are rotated around a center point of the group of atomic objects through a final rotation angle of, for example, 180°. However, the group of atomic objects are not maintained in a colinear chain during the rotation of Objects B and C. Thus, all of the atomic objects remain closer to the confinement potential axis 125 (e.g., which is substantially aligned with the ion trap axis 101). As noted above, the further atomic objects are from the ion trap axis 101, the greater RF heating the atomic objects experience. Thus, various embodiments provide for Object B and Object C to switch positions with lower levels of atomic object RF heating than a simple rotation of 180° of the initial chain to form the final chain. Additionally, the voltages applied to perform the deterministic reshaping and/or reordering function illustrated in FIG. 4 requires lower voltages than is generally necessary to perform a simple 180° rotation of the initial chain to form the final chain.

In various embodiments, the time-dependent potential (e.g., the superposition of the confinement potential and the TT potential) may act to compress and rotate or decompress and rotate the atomic objects in time-overlapping manner. For example, the compression of the rotated initial chain and the continued rotation of the atomic objects about the center point 140 may occur simultaneously, semi-simultaneously, and/or the like. For example, the compression may occur while the rotation is continuing. Similarly, the decompression of the atomic objects and the rotation of the atomic objects may occur in a time-overlapping manner. For example, once the rotation of the atomic objects has been initiated (e.g., during an early portion of the rotation), the confinement ratio may be adjusted from X:1 to Y:1. The confinement ratio may then be maintained at Y:1 for a middle portion of the rotation of the atomic objects, and then adjusted from Y:1 to X:1 during an ending portion of the rotation. In an example embodiment, Panels 404 and/or 406 show at least part of the early portion of the rotation, Panel 408 shows a middle portion of the rotation, and Panels 410 and/or 412 show an ending portion of the rotation.

Still Another Example Deterministic Reshaping and/or Reordering Function

FIG. 5 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In various embodiments, the atomic objects of the group of atomic objects traverse the corresponding trajectories responsive to experiencing a time-dependent potential field generated by the potential generating elements.

Panel 502 illustrates the initial state of a group of atomic objects at an initial time T=$t_0$. In the initial state, the group of atomic objects are in an initial chain in the second configuration. When the group of atomic objects are in the second configuration, Object A, Object B, Object C, and Object D are in a plane (defined by the confinement apparatus, such as ion trap plane 103, in an example embodiment) and in a chain aligned along a confinement potential axis 125 within the plane (defined by the confinement apparatus, in an example embodiment) with Object A and Object D adjacent to one another and disposed between Object B and Object C. In an example embodiment, the confinement potential axis 125 is substantially aligned with the ion trap axis 101. As noted above, Object B and Object C are of the first atomic object type and Object A and Object D are not of the first atomic object type. In an example embodiment, Object A and Object D are of the same atomic object type as one another, which is a different atomic object type than the first atomic object type. In an example embodiment, at the initial state of the group of atomic objects, the confinement potential dominates the potential experienced by the atomic objects within the confinement apparatus. For example, the confinement ratio, the ratio of the strength of the confinement potential to the TT potential, is X:1, where X is greater than 1, while the group of atomic objects are in the initial state. For example, X may be greater than zero and within a range defined by the stability region of the ion trap 100, in an example embodiment.

In an example embodiment, the potential generating elements generate a potential field that causes the atomic objects of the group of atomic objects to traverse trajectories such that the atomic objects move through the positions shown in Panels 504, 506, 508, 510, 512, and reach the final state shown in Panel 514 at final time T=$t_f$. Between Panel 502 and Panel 504, time-dependent potential field causes the initial chain (e.g., comprising the aligned atomic objects of the group of atomic objects) to rotate in a first direction to form a rotated chain responsive to the rotating potential axis 135 rotating through rotation angle $\alpha_1$ between time T=$t_0$ and T=$t_1$. The first direction is in the plane. For example, the initial chain may rotate responsive to experiencing the rotating potential which has rotated such that the rotating potential axis 135 forms a rotation angle $\alpha_1$ with the confinement potential axis 125. In an example embodiment, the initial chain is rotated around the center point 140 (e.g., the point where the confinement potential axis 125 intersects the rotating potential axis 135).

Between Panel 504 and Panel 506, the time-dependent potential field causes the rotated initial chain (e.g., comprising the aligned atomic objects of the group of atomic objects) to be compressed to form a compressed arrangement of the group of atomic objects. For example, the change in the confinement ratio may cause the rotated initial chain to compress along the confinement potential axis 125. For example, the potential generating elements may be controlled (e.g., by the controller 30) to generate a compression potential that causes the group of atomic objects to be compressed along the confinement potential axis. For example, the compression potential may cause the atomic objects to feel a push in the direction of the confinement potential axis 125 that is outward from a point interior to the group of atomic objects (e.g., a point located along the confinement potential axis and between Objects A and D). For example, the confinement ratio, the ratio of the strength of the confinement potential to the TT potential, may be reduced to Y:1, where Y may approach 1 and/or be less than 1. For example, as shown in Panel 506, the confinement ratio may be in the range of approximately 1.2:1 to 0.8:1. In an example embodiment, Y is in a range defined by the stability region of the ion trap 100. In an example embodiment, the confinement ratio is decreased by adjusting the strength of the TT potential. For example, the driver action sequences may be determined such that the TT potential rotates about the center point 140. Moreover, the driver action sequences may be determined such that the rotating potential is sufficient to rotate Objects B and C about the center point 140, but, due to the mass difference between Objects B and C and Objects A and D, Objects A and D do not feel a sufficient force from the rotating potential (e.g., generated by the application of voltages to the TT electrodes 116) to cause rotation of Objects A and D about the center point 140. For example, Objects A, B, C, and D experience the confinement potential generated by RF rails 112 and the TT potential generated by applying voltages to the TT electrodes 116, the combination of which provides a non-rotating potential (e.g., which defines the confinement potential axis 125) and a rotating potential (e.g., which defines the rotating potential axis 135). The combined potential (e.g., the superposition of the confinement potential and the potential generated by application of voltages to the TT electrodes 116) is sufficient to cause atomic objects having masses similar to the mass of Objects B and C to rotate about the center point 140 but is not sufficient to cause atomic objects having masses similar to Objects A and D (e.g., which are less massive that Objects B and C) to rotate about the center point 140. In an example embodiment, the change in the confinement ratio and the change in the TT potential causes compression of the rotated initial chain and causes Object B and Object C to be moved to opposite sides of the confinement potential axis 125. Object B and Object C may continue to rotate about the center point 140 such that at time T=$t_2$, responsive to the rotation of the rotating potential axis 135 through a rotation angle of $\alpha_2$ such that the angle between the confinement potential axis 125 and the rotating potential axis 135 is rotation angle of $\alpha_2$.

Between Panels 506 and 510, the time-dependent potential field (e.g., the superposition of the confinement potential and the TT potential) causes the compressed arrangement of the group of atomic objects to be rotated to form a rotated compressed arrangement of the group of atomic objects. For example, between Panels 506 and 510, the rotating potential continues to rotate, as illustrated by the rotation of the rotating potential axis 135. In various embodiments, Objects B and C continue to rotate in the first direction through the rotation angle $\alpha$ as the rotating potential axis 135 continues to rotate such that the rotation angle $\alpha$ increases from $\alpha_2$ at time T=$t_2$, to $\alpha_3$ at time T=$t_3$, as shown in Panel 508, and $\alpha_4$ at time T=$t_4$, as shown in Panel 510. Objects A and D may be rotated in the second direction about a center of rotation 140. In various embodiments, due to Objects A and D having less mass than Objects B and C, Objects A and D feel a steeper potential hill, caused by the confinement potential and/or the non-rotating potential, compared to Objects B and C. In an example embodiment, the center point 140, which acts as the center of rotation, is located at the intersection between the confinement potential axis 125 and the rotating potential axis 135. In an example embodiment, the confinement potential axis 125 and the rotating potential axis 135 intersect at the center point 140 of the group of atomic objects. The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane. Panel 508 shows an intermediate point in the rotation(s) between the compressed arrangement and the rotated compressed arrangement.

Between Panels 510 and 512, the time-dependent potential field causes the rotated compressed arrangement of the group of atomic objects to be decompressed to form an off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects A and D). For example, a change in the confinement ratio (e.g., the relative strength of the confinement potential to the rotating TT potential) may cause the rotated compressed arrangement of the group of atomic objects to decompress or extend along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain. For example, the confinement ratio may be increased to X:1, where X is greater than 1. For example, X may be in the range defined by the stability region of the ion trap 100, in an example embodiment. In an example embodiment, the confinement ratio is increased by adjusting the strength of the TT potential (e.g., decreasing the absolute value of the voltages applied to the TT electrodes 116). Object B and Object C may continue to rotate about the center point 140 in the first direction responsive to the continued rotation of the rotating potential such that at time T=$t_4$, the rotating potential has rotated through a rotation angle of $\alpha_4$ such that the angle between the confinement potential axis 125 and the rotating potential axis 135 is rotation angle of $\alpha_4$. As Object A and Object D continue rotate around the center point 140 in the second direction, the off-axis final chain is formed at time T=$t_4$.

Between Panels 512 and 514, the time-dependent potential field causes the off-axis final chain to rotate in the first direction such that the angle between the confinement potential axis 125 and the rotating potential axis 135 is a final rotation angle of $\alpha_f$ and a final chain is formed. For example, the final chain may be aligned along the axis and/or substantially aligned along the ion trap axis 101. In an example embodiment, the final rotation angle $\alpha_f$ is approximately 180°. The first direction is in the plane. For example, the off-axis chain may be rotated such that the atomic objects in the final chain are aligned along the confinement potential axis 125. In various embodiments, the center point 140 acts as the center of rotation. For example, the off-axis final chain is rotated around the center point 140 in the first direction to form the final chain.

As can be seen in Panel 514, the final chain is of a second configuration in which Object A and Object D are adjacent to one another and disposed between Object B and Object C, in accordance with an example embodiment. However, Object B and Object C have changed positions between the initial chain and the final chain. In various embodiments, Object A and Object D are in the same position in the final chain as in the initial chain, even though Object B and Object C have changed positions. For example, the initial chain may be ordered Object B, Object A, Object D, Object C and the final chain may be ordered Object C, Object A, Object D, Object B. As should be understood from FIG. 5 and the above, Objects B and C are rotated around a center point of the group of atomic objects through a final rotation angle of, for example, 180°. However, the group of atomic objects are not maintained in a colinear chain during the rotation of Objects B and C. Thus, all of the atomic objects remain closer to the confinement potential axis 125 (e.g., which is substantially aligned with the ion trap axis 101). As noted above, the further atomic objects are from the ion trap axis 101, the greater RF heating the atomic objects experience. Thus, various embodiments provide for Object B and Object C to switch positions with lower levels of atomic object RF heating than a simple rotation of 180° of the initial chain to form the final chain. Additionally, the voltages applied to perform the deterministic reshaping and/or reordering function illustrated in FIG. 5 requires lower voltages than is generally necessary to perform a simple 180° rotation of the initial chain to form the final chain.

In various embodiments, the time-dependent potential (e.g., the superposition of the confinement potential and the TT potential and/or the superposition of the non-rotating potential and the rotating potential) may act to compress and rotate or decompress and rotate the atomic objects in time-overlapping manner. For example, the compression of the rotated initial chain and the continued rotation of the atomic objects about the center point 140 may occur simultaneously, semi-simultaneously, and/or the like. For example, the compression may occur while the rotation is continuing. Similarly, the decompression of the atomic objects and the rotation of the atomic objects may occur in a time-overlapping manner. For example, the time-dependent potential is generated by super-imposing a non-rotating potential and a rotating potential. The axial compression (e.g., compression along the confinement potential axis 125 and/or the ion trap axis 101) is maximal when the rotation angle $\alpha$ is at 90°, thereby causing the compression and later decompression of the group of atomic objects. For example, once the rotation of the atomic objects has been initiated (e.g., during an early portion of the rotation), the confinement ratio may be adjusted from X:1 to Y:1. The confinement ratio may then be maintained at Y:1 for a middle portion of the rotation of the atomic objects, and then adjusted from Y:1 to X:1 during an ending portion of the rotation. In an example embodiment, Panels 504 and/or 506 show at least part of the early portion of the rotation, Panel 508 shows a middle portion of the rotation, and Panels 510 and/or 512 show an ending portion of the rotation.

Yet Another Example Deterministic Reshaping and/or Reordering Function

FIG. 6 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In particular, FIG. 6 illustrates an example deterministic reshaping and/or reordering function where the group of atomic objects is reshaped from a first configuration to a second configuration, or vice versa. In various embodiments, the atomic objects of the group of atomic objects traverse the corresponding trajectories responsive to experiencing a time-dependent potential field generated by the potential generating elements.

In various embodiments, Panels 602 through 608 are the same as the process described with respect to Panels 402 through 408 of FIG. 4, Panels 610R through 616R are the same as the process described with respect to Panels 508 through 514 of FIG. 5, and Panels 610L through 616L are the opposite of the process described with respect to Panels 508 through 502. For example, step/operation 204 (e.g., the solving for the driver action sequences) may be performed for the deterministic reshaping and/or reordering functions described in FIGS. 4 and 5 and portions of the driver action sequences determined for the deterministic reshaping and/or reordering functions described in FIGS. 4 and 5 may be spliced together to provide the driver action sequences used to perform the deterministic reshaping and/or reordering functions described in FIG. 6, in an example embodiment.

Panel 602 illustrates the initial state of a group of atomic objects at an initial time T=$t_0$. In the initial state, the group of atomic objects are in an initial chain in the first configuration. When the group of atomic objects are in the first configuration, Object A, Object B, Object C, and Object D are in a plane (defined by the confinement apparatus, such as ion trap plane 103, in an example embodiment) and in a chain aligned along a confinement potential axis 125 within the plane (defined by the confinement apparatus, in an example embodiment) with Object B and Object C adjacent to one another and disposed between Object A and Object D. Panels 616R and 616L illustrate two possible final states of the group of atomic objects at final time T=$t_f$ where the atomic objects are in a final chain in the second configuration. For example, Option R (corresponding to Panels 610R, 612R, 614R, and 616R) results in Object B being the in the right most position of the final chain and Option L (corresponding to Panels 610L, 612L, 614L, and 616L) results in Object B being in the left most position of the final chain. When the group of atomic objects are in the second configuration, Object A, Object B, Object C, and Object D are in a plane (defined by the confinement apparatus, such as ion trap plane 103, in an example embodiment) and in a chain aligned along a confinement potential axis 125 within the plane (defined by the confinement apparatus, in an example embodiment) with Object A and Object D adjacent to one another and disposed between Object B and Object C. As should be understood, the FIG. 6 could be read in reverse (e.g., starting from Panel 616R or 616L to Panel 602) to provide a deterministic reshaping and/or reordering function where the initial state is the second configuration and the final state is the first configuration.

In an example embodiment, the confinement potential axis 125 is substantially aligned with the ion trap axis 101. As noted above, Object B and Object C are of the first atomic object type and Object A and Object D are not of the first atomic object type. In an example embodiment, Object A and Object D are of the same atomic object type as one another, which is a different atomic object type than the first atomic object type. In an example embodiment, at the initial state of the group of atomic objects, the confinement potential dominates the potential experienced by the atomic objects within the confinement apparatus. For example, the confinement ratio, the ratio of the strength of the confinement potential to the TT potential, is X:1, where X is greater than 1, while the group of atomic objects are in the initial state. For example, X is greater than 1 and is within a range defined by the stability region of the ion trap 100, in an example embodiment.

In an example embodiment, the potential generating elements generate a potential field that causes the atomic objects of the group of atomic objects to traverse trajectories such that the atomic objects move through the positions shown in Panels 604, 606, 608, and either 610R, 612R, 614R, and 616R or 610L, 612L, 614L, and 616L, depending on the desired order of the final chain provided in the final state shown in Panels 616R and 616L at final time T=$t_f$. Between Panel 602 and Panel 604, the time-dependent potential field causes the initial chain (e.g., comprising the aligned atomic objects of the group of atomic objects) to rotate in a first direction to form a rotated chain as the rotating potential rotates through a first sequence angle θ such that the angle between the confinement potential axis 125 and the rotating potential axis 135 is the first sequence angle $β_1$. The first direction is in the plane. For example, the rotating potential may be rotated such that the rotating potential axis 135 forms a first sequence angle $β_1$, at time T=$t_1$, with the confinement potential axis 125. In an example embodiment, the center point 140 of the group of atomic objects is used as the rotation point about which the initial chain is rotated. In various embodiments, the center point 140 is the point where the confinement potential axis 125 intersects the rotating potential axis 135.

Between Panel 604 and Panel 606, the time-dependent potential field causes the rotated initial chain (e.g., comprising the aligned atomic objects of the group of atomic objects) to be compressed to form a compressed arrangement of the group of atomic objects. For example, the potential generating elements may be controlled (e.g., by the controller 30) to generate a compression potential that causes the group of atomic objects to be compressed along the confinement potential axis. For example, the compression potential may cause the atomic objects to feel a push in the direction of the confinement potential axis 125 that is outward from a point interior to the group of atomic objects (e.g., a point located along the confinement potential axis and between Objects B and C). For example, a change in the confinement ratio may cause the rotated initial chain to be compressed along the confinement potential axis 125. For example, the confinement ratio, the ratio of the strength of the confinement potential to the TT potential, may be reduced to Y:1, where Y may approach 1 and/or be less than 1. For example, as shown in Panel 506, the confinement ratio may be in the range of approximately 1.2:1 to 0.8:1. In an example embodiment, the confinement ratio is decreased by adjusting the strength of the TT potential. In an example embodiment, the change in the confinement ratio causes compression and/or rotation of the rotated initial chain such that Object B and Object C move to opposite sides of the confinement potential axis 125. Object B and Object C may continue to rotate about the center point 140 responsive to the continued rotation of the rotating potential such that at time T=$t_2$, the rotating potential axis 135 has rotated through a first sequence angle of $β_2$ such that the angle between the confinement potential axis 125 and the rotating potential axis 135 is first sequence angle of $β_2$.

Between Panels 606 and 608, the time-dependent potential field causes the compressed arrangement of the group of atomic objects to continue to rotate to form a rotated compressed arrangement of the group of atomic objects. In various embodiments, Objects B and C continue to rotate in the first direction responsive to the continued rotation of the rotating potential through the first sequence angle β, such that the first sequence angle θ increases from $β_2$ at time T=$t_2$, to a transition angle $β_m$ at time T=$t_3$, as shown in Panel 508. In various embodiments, transition angle $β_m$ is in the range of approximately 70° to 110°. For example, in an example embodiment, the transition angle $β_m$ is approximately 90°. Objects A and D may be rotated in the second direction about a center point 140. In various embodiments, due to Objects A and D having less mass than Objects B and C, Object A and D feel a steeper hill due to the non-rotating potential compared to Objects B and C. In an example embodiment, the center point 140, which acts as the center of rotation, is located at the intersection between the rotating potential axis 135 and the confinement potential axis 125. The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane.

Between Panel 608 and Panel 610R or 610L, the time-dependent potential field causes the rotated compressed arrangement (e.g., comprising the aligned atomic objects of the group of atomic objects) to be further compressed to form an intermediate arrangement of the group of atomic objects, shown in Panels 610R and 610L. For example, the rotated first compressed arrangement may be further compressed along the confinement potential axis 125. For example, the confinement ratio, the ratio of the strength of the confinement potential to the TT potential, may be reduced to Z:1, where Z is less than Y. In an example embodiment, the confinement ratio is decreased by increasing the strength of the TT potential. In an example embodiment, when in the second compressed arrangement, Object A and Object D are substantially aligned along the confinement potential axis 125 and the rotating potential axis 135 is substantially orthogonal or perpendicular to the confinement potential axis 125. As shown in Panels 610R and 610L, at time T=$t_4$, the angle between the confinement potential axis 125 and the rotating potential axis 135 connecting the atomic objects being swapped (e.g., Object B and Object C) is an initial second sequence angle $γ_1$. In various embodiments, the initial second sequence angle is approximately equal to the transition angle $\beta_m$.

Continuing with Option R, between Panel 610R and 612R, the time-dependent potential field causes the intermediate arrangement of the group of atomic objects to be rotated in the first direction to form a rotated intermediate arrangement of the group of atomic objects at time T=$t_5$, shown in Panel 612R. In various embodiments, Objects B and C are rotated in the first direction responsive to the rotating axis rotating through a second sequence angle from initial second sequence angle $\gamma_1$ at time T=$t_4$ to a second sequence angle $\gamma_{2R}$ at time T=$t_5$. In various embodiments, Object B and C are rotated in the first direction about the center point 140. In an example embodiment, the center point 140 is located at the intersection between the rotating potential axis 135 and the confinement potential axis 125 (which, in an example embodiment, is substantially aligned with the ion trap axis 101). The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane.

Between Panels 612R and 614R, the time-dependent potential field causes the rotated intermediate arrangement of the group of atomic objects to be decompressed and to continue rotating to form an off-axis final chain at time T=$t_6$, shown in Panel 614R. For example, the rotated intermediate arrangement of the group of atomic objects may be decompressed or extended along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects A and D). For example, the confinement ratio may be increased to X:1, where X is greater than 1. For example, X may be greater than 1 and in a range defined by the stability region of the ion tap 100, in an example embodiment. In an example embodiment, the confinement ratio is increased by adjusting the strength of the TT potential (e.g., decreasing the absolute value of the voltages applied to the TT electrodes 116). Object B and Object C may continue to rotate about the center point 140 in the first direction responsive to the continued rotation of the rotating potential such that at time T=$t_6$, the rotating potential axis 135 has rotated through a second sequence angle of $\gamma_{3R}$ such that the angle between the confinement potential axis 125 and the rotating potential axis 135 is second sequence angle $\gamma_{3R}$. As Object A and Object D continue rotate around the center point 140 in the second direction, the off-axis final chain is formed at time T=$t_6$.

Between Panels 614R and 616R, the time-dependent potential field causes the off-axis final chain to rotate in the first direction such that the angle between the confinement potential axis 125 and the rotating potential axis 135 is a final second sequence angle of $\gamma_{fR}$ and a final chain is formed at time T=$t_f$. For example, the final chain may be aligned along the confinement potential axis 125 and/or substantially aligned along the ion trap axis 101. In an example embodiment, the final second sequence angle $\gamma_{fR}$ is approximately 180°. The first direction is in the plane. For example, the off-axis chain may be rotated such that the atomic objects in the final chain are aligned along the confinement potential axis 125. In various embodiments, the center point 140 acts as the center of rotation. For example, the off-axis final chain is rotated around the center point 140 in the first direction to form the final chain.

With respect to Option L, between Panel 610L and 612L, the time-dependent potential field causes the intermediate arrangement of the group of atomic objects to be rotated in the second direction to form a rotated intermediate arrangement of the group of atomic objects at time T=$t_5$, shown in Panel 612L. In various embodiments, Objects B and C are rotated in the second direction through a second sequence angle responsive to the rotation of the rotating potential axis from initial second sequence angle $\gamma_1$ at time T=$t_4$ to second sequence angle $\gamma_{2L}$ at time T=$t_5$. For example, the rotating potential axis 135 is rotated in the second direction and the rotation of Objects B and C are responsive to the rotation of the rotating potential axis 135. In various embodiments, Object B and C are rotated in the second direction about the center point 140. In an example embodiment, the center point 140 is located at the intersection between a rotating potential axis 135 and the confinement potential axis 125 (which, in an example embodiment, is substantially aligned with the ion trap axis 101). The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane.

Between Panels 612L and 614L, the time-dependent potential field causes the rotated intermediate arrangement of the group of atomic objects to be decompressed and to continue rotating to form an off-axis final chain at time T=$t_6$, shown in Panel 614L. For example, the rotated intermediate arrangement of the group of atomic objects may be decompressed or extended along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects A and D). For example, the confinement ratio may be increased to X:1, where X is greater than 1. For example, X may be greater than 1 and in a range defined by the stability region of the ion trap 100, in an example embodiment. In an example embodiment, the confinement ratio is increased by adjusting the strength of the TT potential (e.g., decreasing the absolute value of the voltages applied to the TT electrodes 116). Object B and Object C may continue to rotate about the center point 140 in the second direction responsive to the continued rotation of the rotating potential such that at time $T=t_6$, the rotating potential axis 135 has rotated through a second sequence angle of $\gamma_{3L}$ such that the angle between the confinement potential axis 125 and the rotating potential axis 135 is second sequence angle $\gamma_{3L}$. Object A and Object D may rotate around the center point 140 in the first direction, the off-axis final chain is formed at time $T=t_6$.

Between Panels 614L and 616L, the time-dependent potential field causes the off-axis final chain to rotate in the second direction such that the angle between the confinement potential axis 125 and the rotating potential axis 135 is a final second sequence angle of $\gamma_{fL}$ and a final chain is formed at time $T=t_f$. For example, the final chain may be aligned along the confinement potential axis 125 and/or substantially aligned along the ion trap axis 101. In an example embodiment, the final second sequence angle $\gamma_{fL}$ is approximately 0°. The first direction is in the plane. For example, the off-axis chain may be rotated such that the atomic objects in the final chain are aligned along the confinement potential axis 125. In various embodiments, the center point 140 acts as the center of rotation. For example, the off-axis final chain is rotated around the center point 140 in the second direction to form the final chain.

As can be seen in Panels 616R and 616L, the final chain is of a second configuration in which Object A and Object D are adjacent to one another and disposed between Object B and Object C, in accordance with an example embodiment. Thus, the deterministic reshaping and/or reordering function has transformed the group of atomic objects from a first configuration to a second configuration and enables control over which of Object B and Object C is in the right most or left most position of the final chain.

In various embodiments, the time-dependent potential may act to compress and rotate or decompress and rotate the atomic objects in time-overlapping manner. For example, the compression of the rotated initial chain and the continued rotation of the atomic objects about the center point 140 may occur simultaneously, semi-simultaneously, and/or the like. For example, the compression may occur while the rotation is continuing. For example, as Objects B and C rotate around the center point 140 and/or as the confinement ratio changes, the axial compression experienced by Objects B and C may change, thereby causing compression and/or decompression of the group of atomic objects along confinement potential axis 125 and/or ion trap axis 101. Similarly, the decompression of the atomic objects and the rotation of the atomic objects may occur in a time-overlapping manner. For example, once the rotation of the atomic objects has been initiated (e.g., during an early portion of the rotation), the confinement ratio may be adjusted from X:1 to Y:1. The confinement ratio may then be maintained at Y:1 for a first middle portion of the rotation of the atomic objects, and then adjusted from Y:1 to Z:1 during a second middle portion of the rotation of the atomic objects. The confinement ratio may then be adjusted from Z:1 to X:1 during an ending portion of the rotation, where X, Y, and Z are all within a range defined by the stability region of the ion trap 100. In an example embodiment, Panels 604 and/or 606 show at least part of the early portion of the rotation, Panel 608 shows at least part of the first middle portion of the rotation, Panels 610R and 610L show at least a portion of the second middle portion of the rotation, and Panels 612R, 612L and/or 614R, 614L show an ending portion of the rotation.

As described above, the deterministic reordering and/or reshaping function may be performed in reverse (e.g., from Panel 616R or 616L to Panel 602) to reshape and/or reorder the group of atomic objects from the second configuration to the first configuration. For example, when performing the deterministic reordering and/or reshaping function to transform a group of atomic objects in the second configuration to a group of atomic objects in the first configuration, the potential generating elements of the confinement apparatus may be controlled to generate a time-dependent potential field that causes an initial chain in the first configuration to be rotated in the first direction through a first sequence angle $\beta$ and the confinement ratio may be decreased to Z:1 (in series or overlapping in time) such that the initial chain is transformed into a diamond shape arrangement (e.g., as shown in Panels 610R and 610L). After reaching a transition angle $\beta_m$, the confinement ratio may be increased to Y:1 and then to X:1 and the rotation of Objects B and C may continue from the transition angle to a final second sequence angle, in either the first or second direction as determined based on the desired final ordering of the group of atomic objects, to form a final chain in the second configuration.

Yet Another Example Deterministic Reshaping and/or Reordering Function

Figure 7:
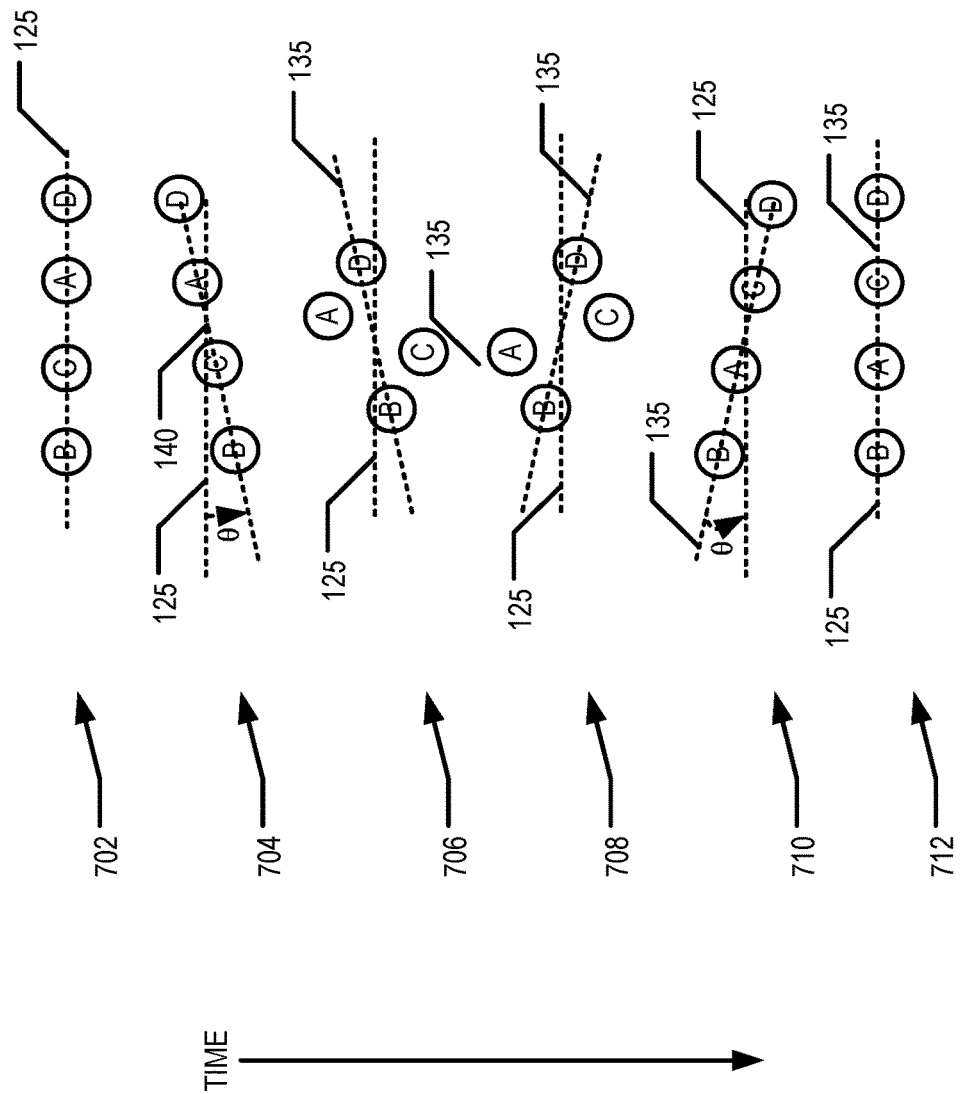
FIG. 7 is a schematic diagram illustrating sets of atomic object trajectories of a group of atomic objects for reshaping the group of atomic objects from an initial state that is one of the third configuration to a final state that is the fourth configuration, in accordance with an example embodiment.

FIG. 7 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In various embodiments, the atomic objects of the group of atomic objects traverse the corresponding trajectories responsive to experiencing a time-dependent potential field generated by the potential generating elements. In the deterministic reshaping and/or reordering function illustrated in FIG. 7, the initial state of the group of atomic objects is the third configuration and the final state of the group of atomic objects is the fourth configuration. As should be understood, the deterministic reshaping and/or reordering function may be performed in the opposite direction illustrated by the time arrow shown in FIG. 7 to deterministically reshape and/or reorder a group of atomic objects from an initial state of the group of atomic objects in the fourth configuration to a final state of the group of atomic objects in the third configuration.

Panel 702 illustrates the initial state of a group of atomic objects. In the initial state, the group of atomic objects are in an initial chain in the third configuration. When the group of atomic objects are in the third configuration, Object A, Object B, Object C, and Object D are in a plane (defined by the confinement apparatus, in an example embodiment) and in a chain aligned along a confinement potential axis 125 within the plane (defined by the confinement apparatus, in an example embodiment) with Object B and Object C adjacent to one another and Object A and Object D adjacent to one another. In an example embodiment, the confinement potential axis 125 is substantially aligned with the ion trap axis 101. In an example embodiment, the confinement potential axis 125 is an axis and/or line that is substantially parallel to the ion trap axis 101 and that passes through the point that is equidistant between Object B and Object C (and/or any pair of atomic objects in the group of atomic objects when the group of atomic objects is in the initial or final state). For example, the confinement potential axis 125 may be an axis and/or line that is substantially parallel to the ion trap axis 101. In various embodiments, the rotating potential axis 135 intersects the confinement potential axis 125 center point 140 of the group of atomic objects. As noted above, Object B and Object C are of the first atomic object type and Object A and Object D are not of the first atomic object type. Object B and Object C have larger masses than Object A and Object D. In an example embodiment, Object A and Object D are of the same atomic object type as one another, which is a different atomic object type than the first atomic object type.

In an example embodiment, at the initial state of the group of atomic objects, the confinement potential dominates the potential experienced by the atomic objects within the confinement apparatus. For example, the confinement ratio, the ratio of the strength of the confinement potential (e.g., generated by the voltages applied to the RF rails 112) to the TT potential, is X:1, where X is greater than 1, while the group of atomic objects are in the initial state. For example, X is such that the voltages applied to the RF rails 112 and the voltages applied to the TT electrodes 116 are within the stability region for the ion trap 100, in an example embodiment. In general, the stability region for the ion trap 100 is defined based on the geometry of the ion trap 100. For example, the stability region may be the first stability region and may be a voltage region for the ion trap 100 in which ions may be trapped within the ion trap 100 in a stable manner. For example, X may be a value that is greater than one such that there is a preferred direction of confinement within the ion trap 100 (e.g., along and/or substantially parallel to the axis 101) and such that trapping within the ion trap 100 is viable.

In an example embodiment, the potential generating elements generate a potential field that causes the atomic objects of the group of atomic objects to traverse trajectories such that the atomic objects move through the positions shown in Panels 704, 706, 708, 710, and reach the final state shown in Panel 712. Though Panels 704, 706, 708, and 710 are split out to show different steps in the movement of the atomic objects, some of these steps may occur simultaneously, in various embodiments. For example, in an example embodiment, the steps shown in Panels 704 and 706 occur simultaneously and/or the steps shown in Panels 708 and 710 occur simultaneously.

Between Panel 702 and Panel 704, the time-dependent potential field causes the initial chain (e.g., comprising the aligned atomic objects of the group of atomic objects) to rotate in a first direction through a first angle θ to form a rotated chain. In various embodiments, the initial chain is rotated about the center point 140 in the first direction through the first angle θ to form the rotated chain. The first direction is in the plane 103. For example, the initial chain may be rotated responsive to the rotation of the rotating potential such that the rotating potential axis 135 forms a first angle θ with the confinement potential axis 125. In various embodiments, the first angle θ is greater than 0° and less than 90°. In an example embodiment, the first angle θ is in the range of approximately 5°-15°.

Between Panel 704 and Panel 706, the time-dependent potential field causes the rotated initial chain (e.g., comprising the aligned atomic objects of the group of atomic objects) to be compressed to form a compressed arrangement of the group of atomic objects. For example, the rotated initial chain may be compressed along the confinement potential axis 125. For example, the potential generating elements may be controlled (e.g., by the controller 30) to generate a compression potential that causes the group of atomic objects to be compressed along the confinement potential axis. For example, the compression potential may cause the atomic objects to feel a push in the direction of the confinement potential axis 125 that is outward from a point interior to the group of atomic objects (e.g., a point located along the confinement potential axis and between Objects A and C). For example, the confinement ratio, the ratio of the strength of the confinement potential to the TT potential, may be reduced to Y:1, where Y may approach 1 and/or be less than 1. For example, as shown in Panel 706, the confinement ratio may be in the range of approximately 1.2:1 to 0.8:1. In an example embodiment, the confinement ratio is decreased by increasing the strength of the TT potential. For example, in an example embodiment, the confinement potential generated by applying voltages to the RF rails 112 may be approximately constant with time (e.g., a time average of the confinement potential over a first period of time may be approximately equal to a time average of the confinement potential over a second period of time). In an example embodiment, compressing the rotated initial chain causes Object C and Object A to be moved to opposite sides of the confinement potential axis 125.

Between Panel 706 and 708, the time-dependent potential field causes the compressed arrangement of the group of atomic objects to be rotated in a second direction through a second angle to form a rotated compressed arrangement of the group of atomic objects. In an example embodiment, the second angle is greater than two times the first angle θ. For example, in Panel 706, the angle between the confinement potential axis 125 and the rotating potential axis 135 is the first angle θ and, in Panel 708, the angle between the confinement potential axis 125 and the rotating potential axis 135 has an opposite sign and a larger absolute value than the first angle θ. For example, between Panel 706 and Panel 708, the axis of the rotating potential rotates by an angle of >2θ in the second direction. The second direction is in the plane and is in the opposite direction of the first direction. For example, if a rotation in the first direction is a counter-clockwise rotation in the plane, a rotation in the second direction is a clockwise rotation in the plane. Similarly, if a rotation in the first direction is a clockwise rotation in the plane, a rotation in the second direction is a counter-clockwise rotation in the plane. In an example embodiment, the rotation of the compressed arrangement of the group of atomic objects is rotated around a point located at the center of the group of atomic objects (e.g., center point 140) to form the rotated compressed arrangement. In an example embodiment, the center of the group of atomic objects is the point where a virtual line connecting the atomic objects being swapped (e.g., Object A and Object C) and a virtual line connecting the atomic objects not being swapped (e.g., Object B and Object D) intersect.

Between Panels 708 and 710, the time-dependent potential field goes through a series of decompression and rotation steps. For example, the time-dependent potential field may cause the rotated compressed arrangement of the group of atomic objects to alternatively be decompressed and rotate a plurality of times to form an off-axis final chain. For example, the potential generating elements may be controlled (e.g., by the controller 30) to generate a decompression potential that causes the group of atomic objects to be decompressed along the confinement potential axis. For example, the decompression potential may cause the atomic objects to feel a push in the direction of the confinement potential axis 125 that is inward toward a point interior to the group of atomic objects (e.g., a point located along the confinement potential axis and between Objects A and C). For example, the confinement ratio may be increased to X:1, where X is greater than 1, through a series of decompression steps that are alternated with rotation steps. For example, X may be in the range of approximately 1.5 to 4.0, in an example embodiment. In an example embodiment, the confinement ratio is increased by decreasing the strength of the TT potential. For example, the rotated compressed arrangement of the group of atomic objects may be decompressed or extended along the confinement potential axis 125. For example, the rotated compressed arrangement of the group of atomic objects may be decompressed, extended, and/or stretched to cause the diamond shape of the rotated compressed arrangement to be transformed into the aligned and/or linear shape of the off-axis final chain. By alternating the small decompression and rotation steps, sudden snapping motions of the atomic objects as the atomic objects reform a chain may be prevented and/or reduced. The reduction and/or prevention of the sudden snapping motions reduces the heating of the atomic objects during the deterministic reshaping and/or reordering function and/or reduces and/or prevents random reordering events of the atomic objects during the performance of the reshaping and/or reordering function.

Between Panels 710 and 712, the time-dependent potential field causes the off-axis final chain to rotate in the first direction, for example, through an angle greater than the first angle θ to form a final chain. For example, the rotating potential axis 135 may be rotated in the first direction by an angle greater than the first angle θ such that rotating potential axis 135 is substantially parallel to the confinement potential axis 125 in Panel 712. The first direction is in the plane. For example, the off-axis chain may be rotated such that the atomic objects in the final chain are aligned along the confinement potential axis 125. In an example embodiment, the off-axis final chain is rotated about the center point 140 to form the final chain. In an example embodiment, the confinement ratio experienced by the final chain is approximately the same as the confinement ratio experienced by the initial chain.

As can be seen in Panel 712, the final chain is of a fourth configuration in which Object B and Object C are not adjacent to one another and Object A and Object D are not adjacent to one another, in accordance with an example embodiment. For example, Object C and Object A have changed positions between the initial chain and the final chain. For example, the initial chain may be ordered Object B, Object C, Object A, Object D and the final chain may be ordered Object B, Object A, Object C, Object D.

In various embodiments, the time-dependent potential may cause Object C and Object A to rotate 180° such that Object C and Object A switch positions between the initial and final states. However, during the second half of the rotation (e.g., between a 90° rotation position and a 180° rotation position), multiple decompression and rotation steps may be performed in an alternating manner. For example, during the first half of the rotation (e.g., between a 0° rotation position and a 90° rotation position) the compression ratio is adjusted from X:1 to Y:1. During the second half of the rotation, the compression ratio is adjusted from Y:1 to X:1 via a series of discrete steps.

In various embodiments, the atomic objects experience heating (e.g., the gaining of thermal energy) due to the confinement potential when they are not located along the ion trap axis 101. This heating mechanism is referred to as RF heating herein. The further from the ion trap axis 101 an atomic object is, the more RF heating the atomic object experiences. The example deterministic reshaping and/or reordering function illustrated in FIG. 7 maintains all of the atomic objects relatively close to the ion trap axis 101 (e.g., which is approximately aligned with the confinement potential axis 125) than a simple 180° rotation of the initial chain to form the final chain. Thus, the RF heating experienced by the atomic objects when the deterministic reshaping and/or reordering function illustrated in FIG. 7 is performed is significantly less than the RF heating experienced by atomic objects during a reshaping and/or reordering function where the atomic objects are not maintained relatively close to the ion trap axis 101.

In various embodiments, the time-dependent potential may act to compress and rotate the atomic objects in time-overlapping manner. For example, the compression of the rotated initial chain and the continued rotation of the atomic objects about the center point 140 may occur simultaneously, semi-simultaneously, and/or the like. For example, the compression may occur while the rotation is continuing. Similarly, the decompression of the atomic objects and the rotation of the atomic objects may occur in a time-overlapping manner. For example, once the rotation of the atomic objects has been initiated (e.g., during an early portion of the rotation), the confinement ratio may be adjusted from X:1 to Y:1. The confinement ratio may then be maintained at Y:1 for a middle portion of the rotation of the atomic objects, and then adjusted from Y:1 to X:1 via a plurality of discrete steps during an ending portion of the rotation.

Still Another Example Deterministic Reshaping and/or Reordering Function

Figure 8:
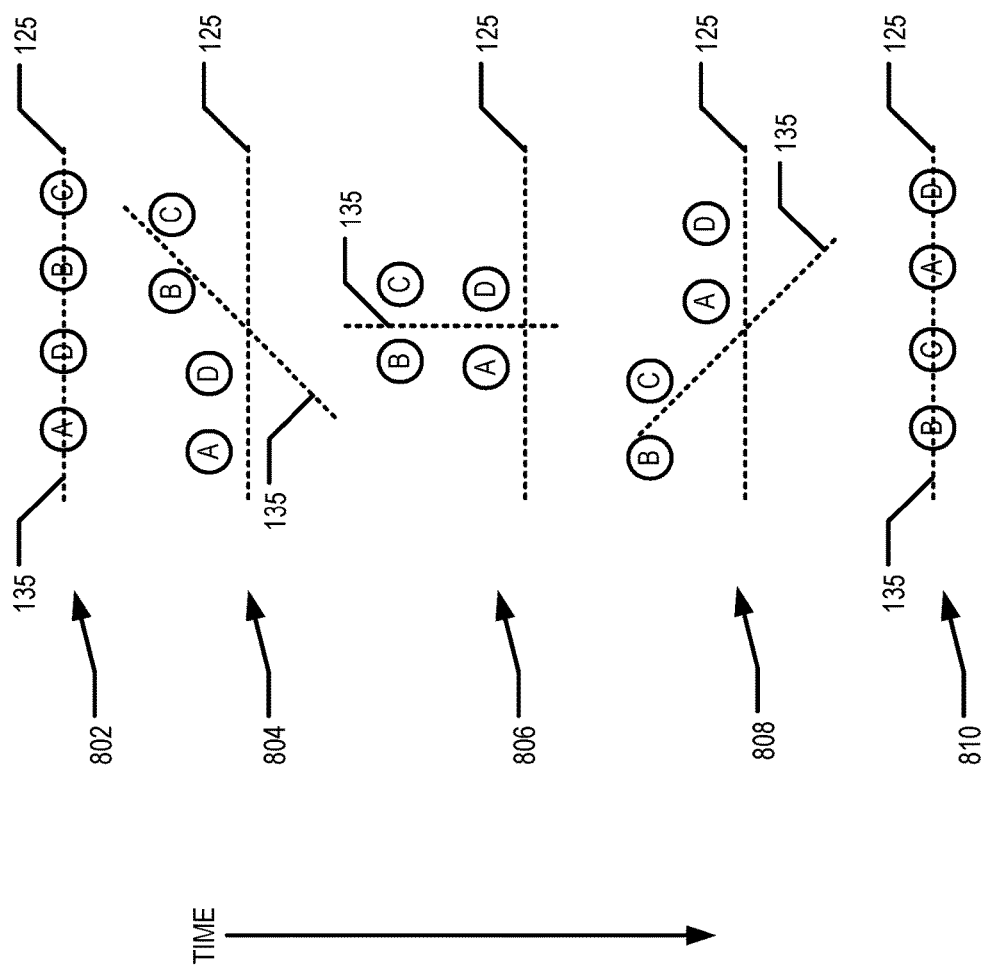
FIG. 8 is a schematic diagram illustrating sets of atomic object trajectories of a group of atomic objects for reordering the group of atomic objects from an initial state that is one of the third configuration to a final state that is of a different third configuration, in accordance with an example embodiment.

FIG. 8 illustrates an initial state of a group of atomic objects and multiple snap shots of the group of atomic objects as each object of the group of atomic objects traverses a trajectory such that a deterministic reshaping and/or reordering function is performed resulting in a final state of the group of atomic objects. In various embodiments, the atomic objects of the group of atomic objects traverse the corresponding trajectories responsive to experiencing a time-dependent potential field generated by the potential generating elements. In the deterministic reshaping and/or reordering function illustrated in FIG. 8, the initial state of the group of atomic objects is the third configuration and the final state of the group of atomic objects is the third configuration. However, between the initial state and the final state, Objects B and C have changed position with Objects A and D, as can be seen in Panels 802 and 810. As should be understood, the deterministic reshaping and/or reordering function may be performed in the opposite direction illustrated by the time arrow shown in FIG. 8 to deterministically reshape and/or reorder a group of atomic objects from an initial state of the group of atomic objects in the third configuration shown in Panel 810 to a final state of the group of atomic objects in the third configuration shown in Panel 802.

Panel 802 illustrates the initial state of a group of atomic objects. In the initial state, the group of atomic objects are in an initial chain in the third configuration. When the group of atomic objects are in the third configuration, Object A, Object B, Object C, and Object D are in a plane (defined by the confinement apparatus, in an example embodiment) and in a chain aligned along a confinement potential axis 125 within the plane (defined by the confinement apparatus, in an example embodiment) with Object B and Object C adjacent to one another and Object A and Object D adjacent to one another. In an example embodiment, the confinement potential axis 125 is substantially aligned with the ion trap axis 101. In an example embodiment, the confinement potential axis 125 is an axis and/or line that is substantially parallel to the ion trap axis 101 and that passes through the center point 140 of the group of atomic objects. For example, the confinement potential axis 125 may be an axis and/or line that is substantially parallel to the ion trap axis 101 As noted above, Object B and Object C are of the first atomic object type and Object A and Object D are not of the first atomic object type. Object B and Object C have larger masses than Object A and Object D. In an example embodiment, Object A and Object D are of the same atomic object type as one another, which is a different atomic object type than the first atomic object type.

In an example embodiment, at the initial state of the group of atomic objects, the confinement potential dominates the potential experienced by the atomic objects within the confinement apparatus. For example, the confinement ratio, the ratio of the strength of the confinement potential (e.g., generated by the voltages applied to the RF rails 112) to the TT potential, is X:1, where X is greater than 1, while the group of atomic objects are in the initial state. For example, X is such that the voltages applied to the RF rails 112 and the voltages applied to the TT electrodes 116 are within the stability region for the ion trap 100, in an example embodiment. In general, the stability region for the ion trap 100 is defined based on the geometry of the ion trap 100. For example, the stability region may be the first stability region and may be a voltage region for the ion trap 100 in which ions may be trapped within the ion trap 100 in a stable manner. For example, X may be a value that is greater than one such that there is a preferred direction of confinement within the ion trap 100 (e.g., along and/or substantially parallel to the axis 101) and such that trapping within the ion trap 100 is viable.

In an example embodiment, the potential generating elements generate a potential field that causes the atomic objects of the group of atomic objects to traverse trajectories such that the atomic objects move through the positions shown in Panels 804, 806, and 808 and reach the final state shown in Panel 810. In various embodiments, the potential field comprises and/or is a superposition of a non-rotating potential (e.g., which defines the confinement potential axis 125) and a rotation potential (e.g., which defines the rotating potential axis 135).

Between Panel 802 and Panel 804, the time-dependent potential field causes the initial chain (e.g., comprising the aligned atomic objects of the group of atomic objects) to be pushed off the confinement potential axis 125. In various embodiments, the TT potential may generate a radial push potential that causes the atomic objects to be pushed away from the confinement potential axis 125. As should be understood, the potential and/or force experienced by an atomic object due to the potential in a radial direction of the confinement apparatus (e.g., in a direction transverse and/or perpendicular to the confinement potential axis 125 or ion trap axis 101) is mass dependent. The heavier atomic objects (Objects B and C) experience a flatter potential hill compared to the steeper potential hill experienced by than the lighter atomic objects (Objects A and D). Thus, the Object B and C move more in response to the radial push potential. Thus, as shown in Panel 804, Objects B and C are pushed further from the confinement potential axis 125 than Objects A and D by the radial push potential.

As shown in Panel 806, Objects B and C have been pushed far enough away from Objects A and D that movement of Objects B and C is generally decoupled from the movement of Objects A and D. Between Panel 806 and 810, the radial push potential may be reduced, such that the atomic objects return to the confinement potential axis 125. For example, the time evolution of the amplitude/magnitude of the radial push potential may comprise a monotonic increase to a maximum followed by a monotonic decrease to a minimum. For example, the amplitude magnitude of the radial push potential may have a triangle wave pulse form over time, such that the radial push potential increases to a maximum and then decreases again.

Between at least a portion of the time between Panels 802 and 810, a rotating potential may be applied (as illustrated by the rotating potential axis 135). For example, the rotating potential may be applied (e.g., via application of voltages to the TT electrodes) in addition to and/or at least partially overlapping with the radial push potential. In various embodiments, the rotating potential rotates through a rotation angle. In various embodiments, the rotation angle (e.g., the angle through which the rotating potential axis 135 rotates) is approximately 180°.

As can be seen in Panel 810, the final chain is of a third configuration in which Object B and Object C are adjacent to one another and Object A and Object D are adjacent to one another, in accordance with an example embodiment. For example, Objects B and C and Objects A and D have changed positions between the initial chain and the final chain. For example, the initial chain may be ordered Object A, Object D, Object B, Object C and the final chain may be ordered Object B, Object C, Object A, Object D.

In various embodiments, a deterministic reshaping and/or reordering function is performed to transform a group of atomic objects from the initial state shown in Panel 802 to a final state shown in Panel 810 using a rotating potential similar to that described above with respect to FIG. 3. For example, the potential generating elements may be controlled to generate a time dependent potential that causes the rotation of a rotating potential axis in a first direction through a first angle with respect to the confinement potential axis, a compression of the group of atomic objects, a rotation of the rotating potential axis in a second direction through a second angle with respect to the confinement potential axis, a decompression of the group of atomic objects, and a rotation of the rotating potential axis in the first direction through a third angle with respect to the confinement potential axis. In addition to the rotating potential and the confinement potential, the time dependent potential may include a radial pushing potential. For example, the time evolution of the amplitude/magnitude of the radial push potential may comprise a monotonic increase to a maximum followed by a monotonic decrease to a minimum. For example, the amplitude magnitude of the radial push potential may have a triangle wave pulse form over time, such that the radial push potential increases to a maximum and then decreases again. The result of the group of atomic objects experiencing the time dependent potential comprising the confinement potential, rotating potential, and radial push potential, may be trajectories similar to those shown in FIG. 8, but with different behavior of the rotating potential axis 135.

In various embodiments, a time dependent potential comprising the confinement potential, rotating potential, and radial push potential may be used to provide atomic groups of various final configurations (e.g., first configuration, second configuration, third configuration, and/or fourth configuration) by tuning the timing and/or maximum amplitude/magnitude of the time evolution of the radial push potential.

Technical Advantages

Various embodiments provide technical solutions to the technical problem of deterministically reshaping and/or reordering a group of atomic objects confined within an atomic object confinement apparatus. Traditional techniques for reordering a group of atomic objects confined within an atomic object rotate the entire group of atomic objects. For example, according to traditional techniques to reorder a group of atomic objects from Panel 502 to Panel 514 in FIG. 5, the entire chain of atomic objects would be rotated 180° around a center of rotation located between Object A and Object D on the confinement potential axis 125. However, this traditional technique requires higher power driver action sequences (e.g., higher voltages) to be applied to the potential generating elements (e.g., electrodes 116) and/or the traditional technique is subject to resulting in random reordering of the atomic objects. Thus, various embodiments provide an improvement over traditional techniques of reordering atomic objects within a confinement apparatus be enabling use of less powerful driver action sequences (e.g., lower voltages) and provides a deterministic reordering of the group of atomic objects. For example, experimental results show that, an example embodiment of the deterministic reshaping and/or reordering functions described herein reduces the required voltages applied to the TT electrodes 116 by more than half compared to simply rotating the initial chain to form the final chain. As used herein, the term deterministic means that the order of the atomic objects and/or positions of the atomic objects in the final state is predetermined and/or known prior to the beginning of the deterministic reshaping and/or reordering function and/or are determined by the reshaping and/or reordering function (rather than spontaneous or random reordering of the atomic objects). Additionally, various embodiments, of the deterministic reshaping and/or reordering function may be performed more quickly (e.g., due to the smaller angle of rotation and/or the atomic objects being maintained closer to the confinement potential axis 125 during performance of the function) than traditional reordering techniques. Moreover, traditional techniques fail to provide a deterministic reshaping of the group of atomic objects. For example, traditional techniques fail to provide a function that transforms a group of atomic objects from the first configuration (with Object B and Object C adjacent to one another and disposed between Object A and Object D) to the second configuration (with Object A and Object D adjacent one another and disposed between Object B and Object C), or vice versa.

In various embodiments wherein the deterministic reshaping and/or reordering functions are performed by a quantum computer to reorder groups of qubits and/or qubit-cooling ion pairs, the improvements provided by various embodiments enables the quantum computer to compile sequences of commands faster and operate at a faster clock speed, compared to quantum computers using traditional reordering techniques.

Thus, various embodiments provide technical improvements to the fields of quantum computer operation (e.g., for a trapped ion quantum computer and/or the like) and to the field of controlling atomic objects within an atomic object confinement apparatus.

Exemplary Quantum Computer Comprising an Ion Trap Apparatus

As described above, the deterministic reshaping and/or reordering function is performed by a controller 30 of a quantum computer 910. FIG. 9 provides a schematic diagram of an example quantum computer system 900 comprising a confinement apparatus (e.g., ion trap 100), in accordance with an example embodiment. In various embodiments, the quantum computer system 900 comprises a computing entity 10 and a quantum computer 910. In various embodiments, the quantum computer 910 comprises a controller 30, a cryostat and/or vacuum chamber 40 enclosing a confinement apparatus (e.g., ion trap 100), and one or more manipulation sources 60. In an example embodiment, the one or more manipulation sources 60 may comprise one or more lasers (e.g., optical lasers, microwave sources, and/or the like). In various embodiments, the one or more manipulation sources 60 are configured to manipulate and/or cause a controlled quantum state evolution of one or more atomic objects within the confinement apparatus. For example, in an example embodiment, wherein the one or more manipulation sources 60 comprise one or more lasers, the lasers may provide one or more laser beams to the confinement apparatus within the cryogenic and/or vacuum chamber 40. In various embodiments, the quantum computer 910 comprises one or more voltage sources 50. For example, the voltage sources 50 may comprise a plurality of TT voltage drivers and/or voltage sources and/or at least one RF driver and/or voltage source. The voltage sources 50 may be electrically coupled to the corresponding potential generating elements (e.g., TT electrodes 116) of the confinement apparatus (e.g., ion trap 100), in an example embodiment.

In various embodiments, a computing entity 10 is configured to allow a user to provide input to the quantum computer 910 (e.g., via a user interface of the computing entity 10) and receive, view, and/or the like output from the quantum computer 910. The computing entity 10 may be in communication with the controller 30 of the quantum computer 910 via one or more wired or wireless networks 20 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the voltage sources 50, cryogenic system and/or vacuum system controlling the temperature and pressure within the cryogenic and/or vacuum chamber 40, manipulation sources 60, and/or other systems controlling various environmental conditions (e.g., temperature, pressure, and/or the like) within the cryogenic and/or vacuum chamber 40 and/or configured to manipulate and/or cause a controlled evolution of quantum states of one or more atomic objects within the confinement apparatus. For example, the controller 30 may cause a controlled evolution of quantum states of one or more atomic objects within the confinement apparatus to execute a quantum circuit and/or algorithm. In various embodiments, the atomic objects confined within the confinement apparatus are used as qubits of the quantum computer 910.

Exemplary Controller

In various embodiments, a confinement apparatus is incorporated into a quantum computer 910. In various embodiments, a quantum computer 910 further comprises a controller 30 configured to control various elements of the quantum computer 910. For example, the controller 30 may be configured to control the voltage sources 50, a cryogenic system and/or vacuum system controlling the temperature and pressure within the cryogenic and/or vacuum chamber 40, manipulation sources 60, and/or other systems controlling the environmental conditions (e.g., temperature, humidity, pressure, and/or the like) within the cryogenic and/or vacuum chamber 40 and/or configured to manipulate and/or cause a controlled evolution of quantum states of one or more atomic objects within the confinement apparatus.

As shown in FIG. 10, in various embodiments, the controller 30 may comprise various controller elements including processing elements 1005, memory 1010, driver controller elements 1015, a communication interface 1020, analog-digital converter elements 1025, and/or the like. For example, the processing elements 1005 may comprise programmable logic devices (CPLDs), microprocessors, coprocessing entities, application-specific instruction-set processors (ASIPs), integrated circuits, application specific integrated circuits (ASICs), field programmable gate arrays (FPGAs), programmable logic arrays (PLAs), hardware accelerators, other processing devices and/or circuitry, and/or the like. and/or controllers. The term circuitry may refer to an entirely hardware embodiment or a combination of hardware and computer program products. In an example embodiment, the processing element 1005 of the controller 30 comprises a clock and/or is in communication with a clock.

For example, the memory 1010 may comprise non-transitory memory such as volatile and/or non-volatile memory storage such as one or more of as hard disks, ROM, PROM, EPROM, EEPROM, flash memory, MMCs, SD memory cards, Memory Sticks, CBRAM, PRAM, FeRAM, RRAM, SONOS, racetrack memory, RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. In various embodiments, the memory 1010 may store qubit records corresponding the qubits of quantum computer (e.g., in a qubit record data store, qubit record database, qubit record table, and/or the like), a calibration table, an executable queue, computer program code (e.g., in a one or more computer languages, specialized controller language(s), and/or the like), and/or the like. In an example embodiment, execution of at least a portion of the computer program code stored in the memory 1010 (e.g., by a processing element 1005) causes the controller 30 to perform one or more steps, operations, processes, procedures and/or the like described herein for tracking the phase of an atomic object within an atomic system and causing the adjustment of the phase of one or more manipulation sources and/or signal(s) generated thereby.

In various embodiments, the driver controller elements 1010 may include one or more drivers and/or controller elements each configured to control one or more drivers. In various embodiments, the driver controller elements 1010 may comprise drivers and/or driver controllers. For example, the driver controllers may be configured to cause one or more corresponding drivers to be operated in accordance with executable instructions, commands, and/or the like scheduled and executed by the controller 30 (e.g., by the processing element 1005). In various embodiments, the driver controller elements 615 may enable the controller 30 to operate a manipulation source 60. In various embodiments, the drivers may be laser drivers; vacuum component drivers; drivers for controlling the flow of current and/or voltage applied to TT, RF, and/or other electrodes used for maintaining and/or controlling the ion trapping potential of the ion trap 100 (and/or other driver for providing driver action sequences to potential generating elements of the confinement apparatus); cryogenic and/or vacuum system component drivers; and/or the like. For example, the drivers may control and/or comprise TT and/or RF voltage drivers and/or voltage sources that provide voltages and/or electrical signals to the TT electrodes 116 and/or RF rails 112. In various embodiments, the controller 30 comprises means for communicating and/or receiving signals from one or more optical receiver components such as cameras, MEMs cameras, CCD cameras, photodiodes, photomultiplier tubes, and/or the like. For example, the controller 30 may comprise one or more analog-digital converter elements 1025 configured to receive signals from one or more optical receiver components, calibration sensors, and/or the like.

In various embodiments, the controller 30 may comprise a communication interface 1020 for interfacing and/or communicating with a computing entity 10. For example, the controller 30 may comprise a communication interface 1020 for receiving executable instructions, command sets, and/or the like from the computing entity 10 and providing output received from the quantum computer 910 (e.g., from an optical collection system) and/or the result of a processing the output to the computing entity 10. In various embodiments, the computing entity 10 and the controller 30 may communicate via a direct wired and/or wireless connection and/or one or more wired and/or wireless networks 20.

Exemplary Computing Entity

FIG. 11 provides an illustrative schematic representative of an example computing entity 10 that can be used in conjunction with embodiments of the present invention. In various embodiments, a computing entity 10 is configured to allow a user to provide input to the quantum computer 910 (e.g., via a user interface of the computing entity 10) and receive, display, analyze, and/or the like output from the quantum computer 910.

As shown in FIG. 11, a computing entity 10 can include an antenna 1112, a transmitter 1104 (e.g., radio), a receiver 1106 (e.g., radio), and a processing element 1108 that provides signals to and receives signals from the transmitter 1104 and receiver 1106, respectively. The signals provided to and received from the transmitter 1104 and the receiver 1106, respectively, may include signaling information/data in accordance with an air interface standard of applicable wireless systems to communicate with various entities, such as a controller 30, other computing entities 10, and/or the like. In this regard, the computing entity 10 may be capable of operating with one or more air interface standards, communication protocols, modulation types, and access types. For example, the computing entity 10 may be configured to receive and/or provide communications using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 10 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 10 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Via these communication standards and protocols, the computing entity 10 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 10 can also download changes, add-ons, and updates, for instance, to its firmware, software (e.g., including executable instructions, applications, program modules), and operating system.

The computing entity 10 may also comprise a user interface device comprising one or more user input/output interfaces (e.g., a display 1116 and/or speaker/speaker driver coupled to a processing element 1108 and a touch screen, keyboard, mouse, and/or microphone coupled to a processing element 1108). For instance, the user output interface may be configured to provide an application, browser, user interface, interface, dashboard, screen, webpage, page, and/or similar words used herein interchangeably executing on and/or accessible via the computing entity 10 to cause display or audible presentation of information/data and for interaction therewith via one or more user input interfaces. The user input interface can comprise any of a number of devices allowing the computing entity 10 to receive data, such as a keypad 1118 (hard or soft), a touch display, voice/speech or motion interfaces, scanners, readers, or other input device. In embodiments including a keypad 1118, the keypad 1118 can include (or cause display of) the conventional numeric (0-9) and related keys (#, *), and other keys used for operating the computing entity 10 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the computing entity 10 can collect information/data, user interaction/input, and/or the like.

The computing entity 10 can also include volatile storage or memory 1122 and/or non-volatile storage or memory 1124, which can be embedded and/or may be removable. For instance, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the computing entity 10.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for deterministically reordering a group of atomic objects within an atomic object confinement apparatus, the method comprising:
providing a plurality of atomic objects in an atomic object confinement apparatus, wherein:
the atomic object confinement apparatus comprises a plurality of potential generating elements,
the plurality of atomic objects comprises Object A, Object B, Object C, and Object D,
Object B and Object C are of a first atomic type, and
Object A and Object D are not of the first atomic type; and
controlling potential generating elements of the plurality of potential generating elements to create a time dependent potential field within the atomic object confinement apparatus that causes Object A, Object B, Object C, and Object D to move along corresponding reordering trajectories, the time dependent potential field comprising a confinement potential and a rotating potential, the reordering trajectories comprising:
an initial chain comprising Object A, Object B, Object C, and Object D aligned substantially along a confinement potential axis of the confinement potential,
a rotation of Object B and Object C in a first direction caused by a rotating potential axis defined by the rotating potential rotating in a first direction such that the rotating potential axis rotates through a rotation angle with respect to the confinement potential axis; and
realignment of the group of atomic objects into a final chain, the final chain comprising Object A, Object B, Object C, and Object D substantially aligned along the confinement potential axis and in a different order with respect to the initial chain,
wherein during a beginning portion of the rotation, a confinement ratio of the time dependent potential is adjusted to cause a compression of the group of atomic objects in a direction substantially aligned with the confinement potential axis,
wherein during an ending portion of the rotation, the confinement ratio of the time dependent potential is adjusted to cause a decompression the group of atomic objects in the direction substantially aligned with the confinement potential axis.

2. The method of claim 1, wherein the rotation angle is approximately 180°.

3. The method of claim 1, wherein an interior two of Object A, Object B, Object C, and Object D in the initial chain have switched positions in the final chain.

4. The method of claim 1, wherein an exterior two of Object A, Object B, Object C, and Object D in the initial chain have switched positions in the final chain.

5. The method of claim 1, wherein an exterior two of Object A, Object B, Object C, and Object D in the initial chain are an interior two of the final chain.

6. The method of claim 1, wherein the potential generating elements are controlled in accordance with a solution for a time-dependent potential field found by solving a Hamiltonian using the reordering trajectories.

7. The method of claim 1, wherein the atomic objects are ions, the atomic object confinement apparatus is an ion trap, the potential generating elements are electrodes, and the potential generating elements are controlled by applying voltages thereto by corresponding voltage drivers.

8. The method of claim 1, wherein during a middle portion of the rotation, the middle portion being between the early and the ending portions of the rotation, the group of atomic objects is not colinear.

9. The method of claim 1, wherein after the angle between the rotating potential axis and the confinement potential axis reaches a transition angle, the confinement ratio of the time dependent potential is adjusted to cause one of (a) a further compression the group of atomic objects in the direction substantially aligned with the confinement potential axis or (b) a partial decompression the group of atomic objects in the direction substantially aligned with the confinement potential axis.

10. The method of claim 9, wherein (a) the rotation angle is the transition angle, and (b) after the rotating potential axis has rotated through the rotation angle in the first direction, the rotating potential axis is rotated in a second direction such that the rotating potential axis rotates with respect to the confinement potential axis through a second sequence angle, the second direction being opposite the first direction.

11. The method of claim 9, wherein the transition angle is in the range of approximately 70°-110°.

12. A method for deterministically reordering atomic objects within an atomic object confinement apparatus, the method comprising:
    providing a plurality of atomic objects in an atomic object confinement apparatus, wherein:
        the atomic object confinement apparatus comprises a plurality potential generating elements,
        the plurality of atomic objects comprises Object A, Object B, Object C, and Object D,
        Object B and Object C are of a first atomic type, and Object A and Object D are not of the first atomic type; and
    controlling potential generating elements of the plurality of potential generating elements to create a time dependent potential field within the atomic object confinement apparatus that causes Object A, Object B, Object C, and Object D move along corresponding reordering trajectories, the time dependent potential field being a superposition of a confinement potential and a rotating potential, the reordering trajectories comprising:
        an initial chain comprising Object A, Object B, Object C, and Object D aligned substantially along a confinement potential axis of the confinement potential,
        a rotation of the initial chain to form a rotated initial chain caused by a rotating potential axis defined by the rotating potential rotating in a first direction such that the rotating potential axis rotates by a first angle with respect to the confinement potential axis,
        a compression of the rotated initial chain along a direction substantially parallel to the confinement potential axis to form a compressed configuration,
        a rotation of the compressed configuration in a second direction caused by the rotating potential axis rotating in the second direction such that the rotating potential axis rotates through a second angle with respect to the confinement potential axis, the second angle being substantially equal to or greater than two times the first angle and the second direction being opposite the first direction, to provide a rotated configuration,
        a decompression of the rotated configuration along the confinement potential axis to form an off-axis final chain, and
        a rotation of the off-axis final chain in the first direction caused by the rotating potential axis rotating in the first direction such that the rotating potential axis rotates through a third angle to cause the rotating potential axis to be substantially parallel to the confinement potential axis and provide a final chain, wherein an interior two of Object A, Object B, Object C, and Object D in the initial chain have switched positions in the final chain.

13. The method of claim 12, wherein the first angle is greater than 0° and less than 90°.

14. The method of claim 12, wherein the first angle is greater than 5° and less than 60°.

15. The method of claim 12, wherein the compression and decompression is caused by adjusting a confinement ratio of the time dependent potential.

16. The method of claim 12, wherein the potential generating elements are controlled in accordance with a solution for a time-dependent potential field found by solving a Hamiltonian using the reordering trajectories.

17. The method of claim 12, wherein the atomic objects are ions, the atomic object confinement apparatus is an ion trap, the potential generating elements are electrodes, and the potential generating elements are controlled by applying voltages thereto by corresponding voltage drivers.

18. A method for deterministically reordering a group of atomic objects within an atomic object confinement apparatus, the method comprising:
    providing a plurality of atomic objects in an atomic object confinement apparatus, wherein:
        the atomic object confinement apparatus comprises a plurality of potential generating elements,
        the plurality of atomic objects comprises Object A, Object B, Object C, and Object D,
        Object B and Object C are of a first atomic type, and Object A and Object D are not of the first atomic type; and
    controlling potential generating elements of the plurality of potential generating elements to create a time dependent potential field within the atomic object confinement apparatus that causes Object A, Object B, Object C, and Object D to move along corresponding reordering trajectories, the time dependent potential field being a superposition of a confinement potential, a rotating potential, and a radial push potential, a time evolution of the amplitude of the radial push potential consisting of a monotonic increase to a maximum followed by a monotonic decrease to a minimum, wherein the reordering trajectories comprise:
        an initial chain comprising Object A, Object B, Object C, and Object D aligned substantially along a confinement potential axis of the confinement potential with Object B and Object C adjacent to one another and Object A and Object D adjacent to one another,
        a movement of Object A, Object B, Object C, and Object D radially outward from the confinement potential axis, wherein Object B and Object C move farther from the confinement potential axis than Object A and Object D,
        a movement of Object B and Object C from a first side of Object A and Object D to a second, opposite side of Object A and Object D, and a realignment of Object A, Object B, Object C, and Object D along the confinement potential axis in a final chain;

wherein the final chain comprises Object A, Object B, Object C, and Object D with Object B and Object C in opposite positions with respect Object A and Object D with respect to the initial chain.

19. The method of claim 18, wherein a time evolution of the rotating potential comprises:

a first rotation of a rotating potential axis of the rotating potential in a first direction through a first angle with respect to a confinement potential axis of the confinement potential;

a second rotation of the rotating potential axis in a second direction through a second angle with respect to the confinement potential axis, wherein the second direction is opposite the first direction and the second angle being substantially equal to two times the first angle; and a third rotation of the rotating potential axis in the first direction through a third angle with respect to the confinement potential axis, wherein the third angle is substantially equal to the first angle.

20. The method of claim 18, wherein a time evolution of the rotating potential comprises a rotation of a rotating potential axis of the rotating potential in a first direction through an angle of approximately 180° with respect to a confinement potential axis of the confinement potential.

* * * * *